United States Patent
Saad et al.

(10) Patent No.: US 12,307,454 B2
(45) Date of Patent: May 20, 2025

(54) LAUNDERING DETECTION IN SECOND LAYER NETWORKS

(71) Applicant: PAYPAL, INC., San Jose, CA (US)

(72) Inventors: Muhammad Saad, Scottsdale, AZ (US); Jakub Burgis, Scottsdale, AZ (US); Raoul Johnson, Scottsdale, AZ (US)

(73) Assignee: PAYPAL, INC., San Jose, CA (US)

( * ) Notice: Subject to any disclaimer, the term of this patent is extended or adjusted under 35 U.S.C. 154(b) by 301 days.

(21) Appl. No.: 17/562,754

(22) Filed: Dec. 27, 2021

(65) Prior Publication Data

US 2023/0206231 A1 Jun. 29, 2023

(51) Int. Cl.
*G06Q 20/40* (2012.01)
*H04L 9/00* (2022.01)
*H04L 9/32* (2006.01)

(52) U.S. Cl.
CPC ......... *G06Q 20/401* (2013.01); *H04L 9/3239* (2013.01); *G06Q 2220/00* (2013.01); *H04L 9/50* (2022.05); *H04L 2209/56* (2013.01)

(58) Field of Classification Search
CPC ............. G06Q 20/401; G06Q 2220/00; G06Q 20/065; G06Q 20/223; H04L 9/3239; H04L 9/50; H04L 2209/56; H04L 9/3297
See application file for complete search history.

(56) References Cited

U.S. PATENT DOCUMENTS

| | | | |
|---|---|---|---|
| 11,522,705 B2* | 12/2022 | Naqvi | .......... G06Q 20/405 |
| 2019/0013943 A1* | 1/2019 | Maim | .......... G06Q 20/3678 |
| 2019/0095879 A1 | 3/2019 | Eyal et al. | |
| 2020/0013027 A1 | 1/2020 | Zhu | |
| 2021/0073212 A1* | 3/2021 | Conley | .......... H04L 9/3213 |
| 2021/0398116 A1 | 12/2021 | Fang et al. | |

OTHER PUBLICATIONS

Poon et al., The Bitcoin Lightning Network: Scalable Off-Chain Instant Payments, Jan. 14, 2016, https://lightning.network/lightning-network-paper.pdf (Year: 2016).*

(Continued)

*Primary Examiner* — John W Hayes
*Assistant Examiner* — Yingying Zhou
(74) *Attorney, Agent, or Firm* — HAYNES AND BOONE, LLP

(57) ABSTRACT

Methods and systems are presented for tracking activities that occur off of a first layer blockchain in in a second layer network built on the first layer blockchain. In one embodiment, a computer system determines that a transfer of cryptocurrency from a first node to a second node has transpired in the second layer network based on querying channel capacities in the second layer network. The computer system determines a first public address for the first node based on information associated with a first channel that connects the computer system and the first node in the second layer network, and determines a second public address for the second node based on information associated with a second channel that connects the computer system and the second node in the second layer network. The first public address and the second public address are used to monitor activity in the first layer blockchain.

20 Claims, 19 Drawing Sheets

(56) References Cited

OTHER PUBLICATIONS

Gudgeon et al., SoK: Layer-Two Blockchain Protocols, Financial Cryptography and Data Security, 24th International Conf, FC2020, pp. 201-226 (Year: 2020).*

Avarikioti et al., Payment Network Design with Fees, https:/arxiv.org/pdf/1810.0785.pdf, Oct. 17, 2018 (Year: 2018).*

Stasi et al., Routing payments on the Lightning Network, 2018 IEEE Confs on Internet of Things, Green Computing and Communications, Cyber, Physical and Social Computing, Smart Data, Blockchain, Computer and Information Technology, Congress on Cybermatics, pp. 1161-1170, IEEE (Year: 2018).*

Waugh et al., An empirical study of availability and reliability properties of the Bitcoin Lightning Network, https://arxiv.org/pdf/2006.14358.pdf (Year: 2020).*

International Search Report and Written Opinion for Application No. PCT/US2022/052675 mailed on Apr. 17, 2023, 9 pages.

\* cited by examiner

US 12,307,454 B2

LAUNDERING DETECTION IN SECOND LAYER NETWORKS

TECHNICAL FIELD

The present specification generally relates to blockchain technology, and more specifically, to detecting laundering activities in a second layer network built upon blockchain-based systems according to various embodiments of the disclosure.

BACKGROUND

Blockchains have become a popular computer data structure for storing transaction data due to its inherent peer-to-peer and immutable characteristics. For example, blockchains have been used as a decentralized ledger to record transaction data associated with various cryptocurrencies, smart contracts, and other types of transaction data. Copies and/or parts of a blockchain can be stored across different computer nodes, where each computer node may be configured to validate transactions and add new transaction data to the blockchain. As a new transaction is conducted, one or more of the computer nodes may be configured to validate the new transaction (e.g., through a proof-of-work or a proof-of-stake mechanism, etc.). Once the new transaction is validated, the transaction data of the new transaction may be packaged into a block and appended to the copies of the blockchain by the one or more of the computer nodes. However, second layer network protocols have been introduced for blockchains, which have made it difficult to track the flow of cryptocurrencies. The present disclosure provides solutions that allow for tracking cryptocurrency transactions that occur off-chain using second layer network protocols.

Figure 1:
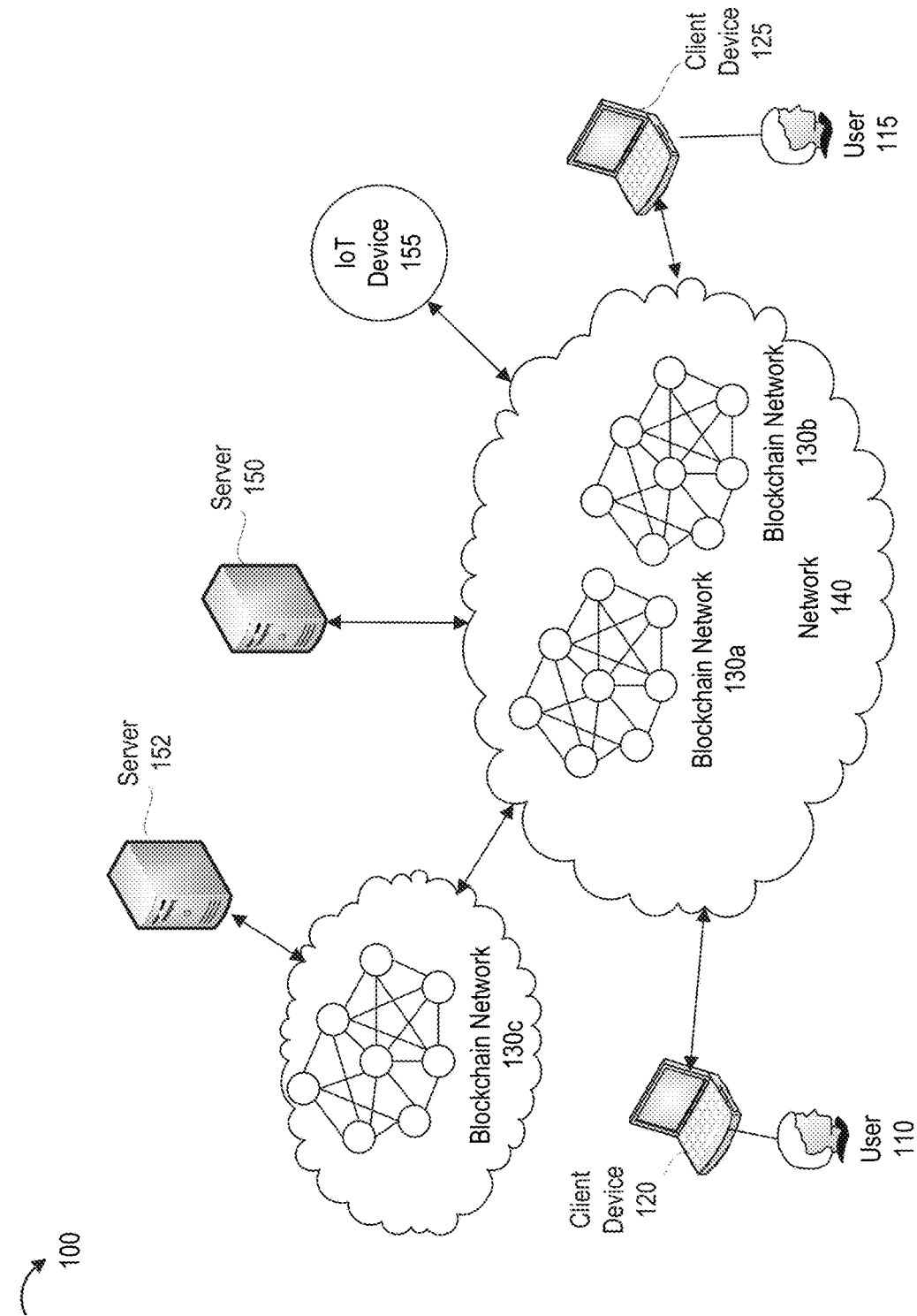
FIG. 1 illustrates an example computing architecture for facilitating one or more blockchain based transactions according to an embodiment of the present disclosure.

Embodiments of the present disclosure and their advantages are best understood by referring to the detailed description that follows. It should be appreciated that like reference numerals are used to identify like elements illustrated in one or more of the figures, wherein showings therein are for purposes of illustrating embodiments of the present disclosure and not for purposes of limiting the same.

DETAILED DESCRIPTION

Blockchains

In its broadest sense, blockchain refers to a framework that supports a trusted ledger that is stored, maintained, and updated in a distributed manner in a peer-to-peer network. For example, in a cryptocurrency application, such as Bitcoin or Ethereum, Ripple, Dash, Litecoin, Dogecoin, zCash, Tether, Bitcoin Cash, Cardano, Stellar, EOS, NEO, NEM, Bitshares, Decred, Augur, Komodo, PIVX, Waves, Steem, Monero, Golem, Stratis, Bytecoin, Ardor, or in digital currency exchanges, such as Coinbase, Kraken, CEX.IO, Shapeshift, Poloniex, Bitstamp, Coinmama, Bisq, LocalBitcoins, Gemini and others, the distributed ledger represents each transaction where units of the cryptocurrency are transferred between entities. For example, using a digital currency exchange, a user may buy any value of digital currency or exchange any holdings in digital currencies into worldwide currency or other digital currencies. Each transaction can be verified by the distributed ledger and only verified transactions are added to the ledger. The ledger, along with many aspects of blockchain, may be referred to as "decentralized" in that a central authority is typically not present. Because of this, the accuracy and integrity of the ledger cannot be attacked at a single, central location. Modifying the ledger at all, or a majority thereof, at locations where it is stored is made difficult so as to protect the integrity of the ledger. This is due in large part to the individuals associated with the nodes that make up the peer-to-peer network having a vested interest in the accuracy of the ledger.

Though maintaining cryptocurrency transactions in the distributed ledger may be the most recognizable use of blockchain technology today, the ledger may be used in a variety of different fields. Indeed, blockchain technology is applicable to any application where data of any type may be accessed where the accuracy of the data is assured. For example, a supply chain may be maintained in a blockchain ledger, where the transfer of each component from party to party, and location to location, may be recorded in the ledger for later retrieval. Doing so allows for easier identification of a source for a defective part and where other such defective parts have been delivered. Similarly, food items may be tracked in like manner from farm to grocery store to purchaser.

Implementations of the present disclosure will now be described in detail with reference to the accompanying Figures.

It is to be understood that the phraseology and terminology used herein are for the purpose of description and should not be regarded as limiting. Rather, the phrases and terms used herein are to be given their broadest interpretation and meaning. The use of "including" and "comprising" and variations thereof is meant to encompass the items listed thereafter and equivalents thereof as well as additional items and equivalents thereof.

Computing Architecture

As discussed above, the distributed ledger in a blockchain framework is stored, maintained, and updated in a peer-to-peer network. In one example the distributed ledger maintains a number of blockchain transactions. FIG. 1 shows an example system 100 for facilitating a blockchain transaction. The system 100 includes a first client device 120, a second client device 125, a first server 150, a second server 152, and an Internet of Things (IoT) device 155 interconnected via a network 140. The first client device 120, the second client device 125, the first server 150, and/or the second server 152 may be a computing device 1105 described in more detail with reference to FIG. 11. The IoT device 155 may comprise any of a variety of devices including vehicles, home appliances, embedded electronics, software, sensors, actuators, thermostats, light bulbs, door locks, refrigerators, RFID implants, RFID tags, pacemakers, wearable devices, smart home devices, cameras, trackers, pumps, POS devices, and stationary and mobile communication devices along with connectivity hardware configured to connect and exchange data. The network 140 may be any of a variety of available networks, such as the Internet, and represents a worldwide collection of networks and gateways to support communications between devices connected to the network 140. The system 100 may also comprise one or more distributed or peer-to-peer (P2P) networks, such as a first, second, and third blockchain networks 130a-c (generally referred to as blockchain networks 130). As shown in FIG. 1, the network 140 may comprise the first and second blockchain networks 130a and 130b. The third blockchain network 130c may be associated with a private blockchain as described below with reference to FIG. 2 and is connected to one or more servers, such as the second server 152, and is thus, shown separately from the first and second blockchain networks 130a and 103b. Each of the blockchain networks 130 may comprise a plurality of interconnected devices (or nodes) as described in more detail with reference to FIG. 2. As discussed above, a ledger, or blockchain, is a distributed database for maintaining a growing list of records comprising any type of information. A blockchain, as described in more detail with reference to FIG. 3, may be stored at least at multiple nodes (or devices) of the one or more blockchain networks 130.

In one example, a blockchain based transaction may generally involve a transfer of data or value between entities, such as the first user 110 of the first client device 120 and the second user 115 of the second client device 125 in FIG. 1. Each of the servers 150 and 152 may include one or more applications, for example, a transaction application configured to facilitate the transaction between the entities by utilizing a blockchain associated with one of the blockchain networks 130. As an example, the first user 110 may request or initiate a transaction with the second user 115 via a user application executing on the first client device 120. The transaction may be related to a transfer of value or data from the first user 110 to the second user 115. The first client device 120 may send a request of the transaction to the first server 150. The first server 150 and/or the second server 152 may send the requested transaction to one of the blockchain networks 130 to be validated and approved as discussed below.

Blockchain Network

Figure 2:
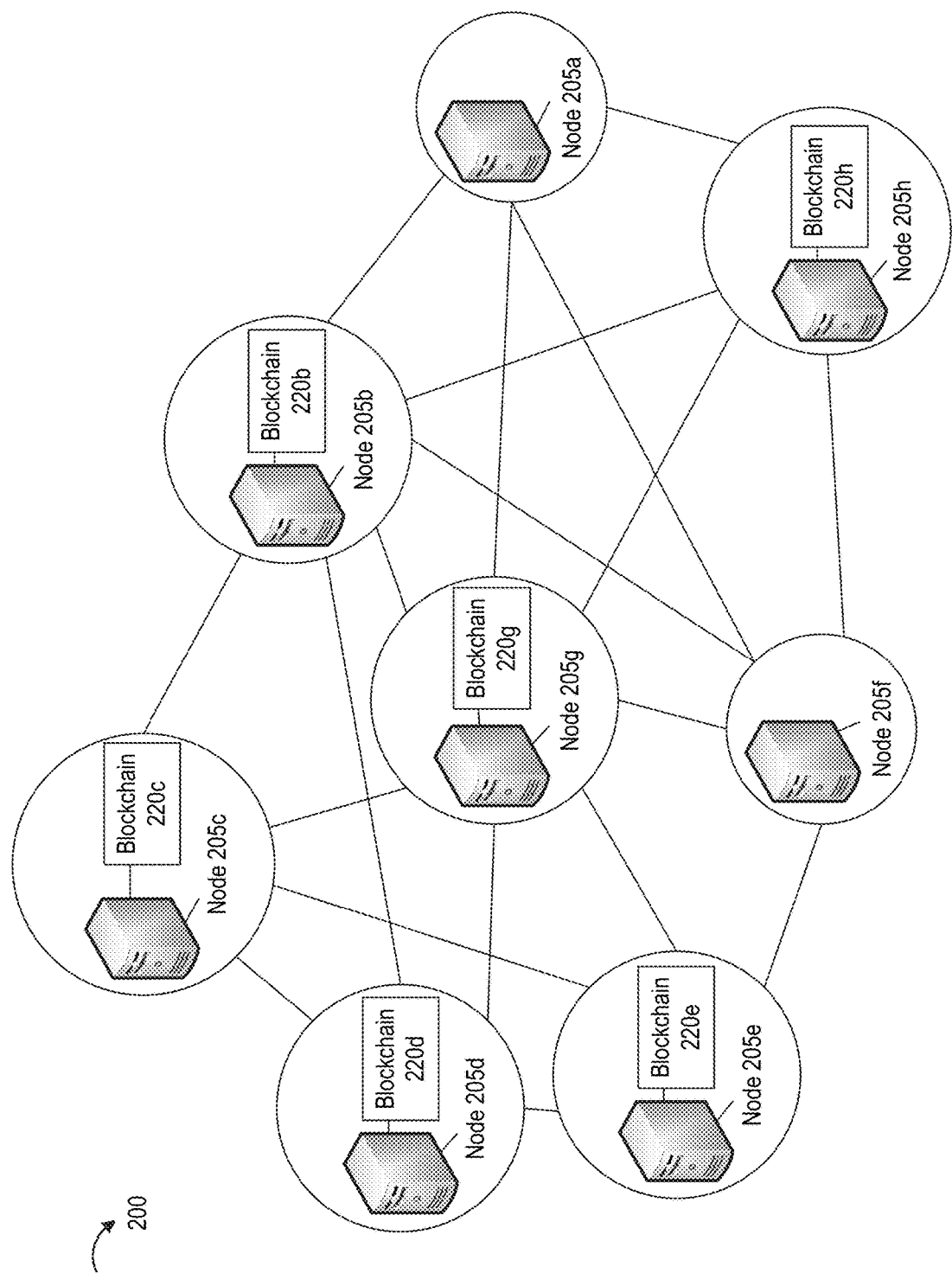
FIG. 2 illustrates an example blockchain network according to an embodiment of the present disclosure.

FIG. 2 shows an example blockchain network 200 comprising a plurality of interconnected nodes or devices 205a-h (generally referred to as nodes 205). Each of the nodes 205 may comprise a computing device 1105 described in more detail with reference to FIG. 11. Although FIG. 2 shows a single device for each of the nodes 205, each of the nodes 205 may comprise a plurality of devices (e.g., a pool). The blockchain network 200 may be associated with one or more blockchains 220a-h (generally referred to as blockchain 220). Some or all of the nodes 205 may replicate and save an identical copy of the blockchain 220. For example, FIG. 2 shows that the nodes 205b-e and 205g-h store copies of the blockchain 220. The nodes 205b-e and 205g-h may independently update their respective copies of the blockchain 220 as discussed below.

Blockchain Node Types

Blockchain nodes, for example, the nodes 205, may be full nodes or lightweight nodes. Full nodes, such as the nodes 205b-e and 205g-h, may act as a server in the blockchain network 200 by storing a copy of the entire blockchain 220 and ensuring that transactions posted to the blockchain 220 are valid. The full nodes 205b-e and 205g-h may publish new blocks on the blockchain 220. Lightweight nodes, such as the nodes 205a and 205f, may have fewer computing resources than full nodes. For example, IoT devices often act as lightweight nodes. The lightweight nodes may communicate with other nodes 205, provide the full nodes 205b-e and 205g-h with information, and query the status of a block of the blockchain 220 stored by the full nodes 205b-e and 205g-h. In this example, however, as shown in FIG. 2, the lightweight nodes 205a and 205f may not store a copy of the blockchain 220 and thus, may not publish new blocks on the blockchain 220.

Blockchain Network Types

The blockchain network 200 and its associated blockchain 220 may be public (permissionless), federated or consortium, or private. If the blockchain network 200 is public, then any entity may read and write to the associated blockchain 220. However, the blockchain network 200 and its associated blockchain 220 may be federated or consortium if controlled by a single entity or organization. Further, any of the nodes 205 with access to the Internet may be restricted from participating in the verification of transactions on the blockchain 220. The blockchain network 200 and its associated blockchain 220 may be private (permissioned) if access to the blockchain network 200 and the blockchain 220 is restricted to specific authorized entities, for example organizations or groups of individuals. Moreover, read permissions for the blockchain 220 may be public or restricted while write permissions may be restricted to a controlling or authorized entity.

Blockchain

Figure 3:
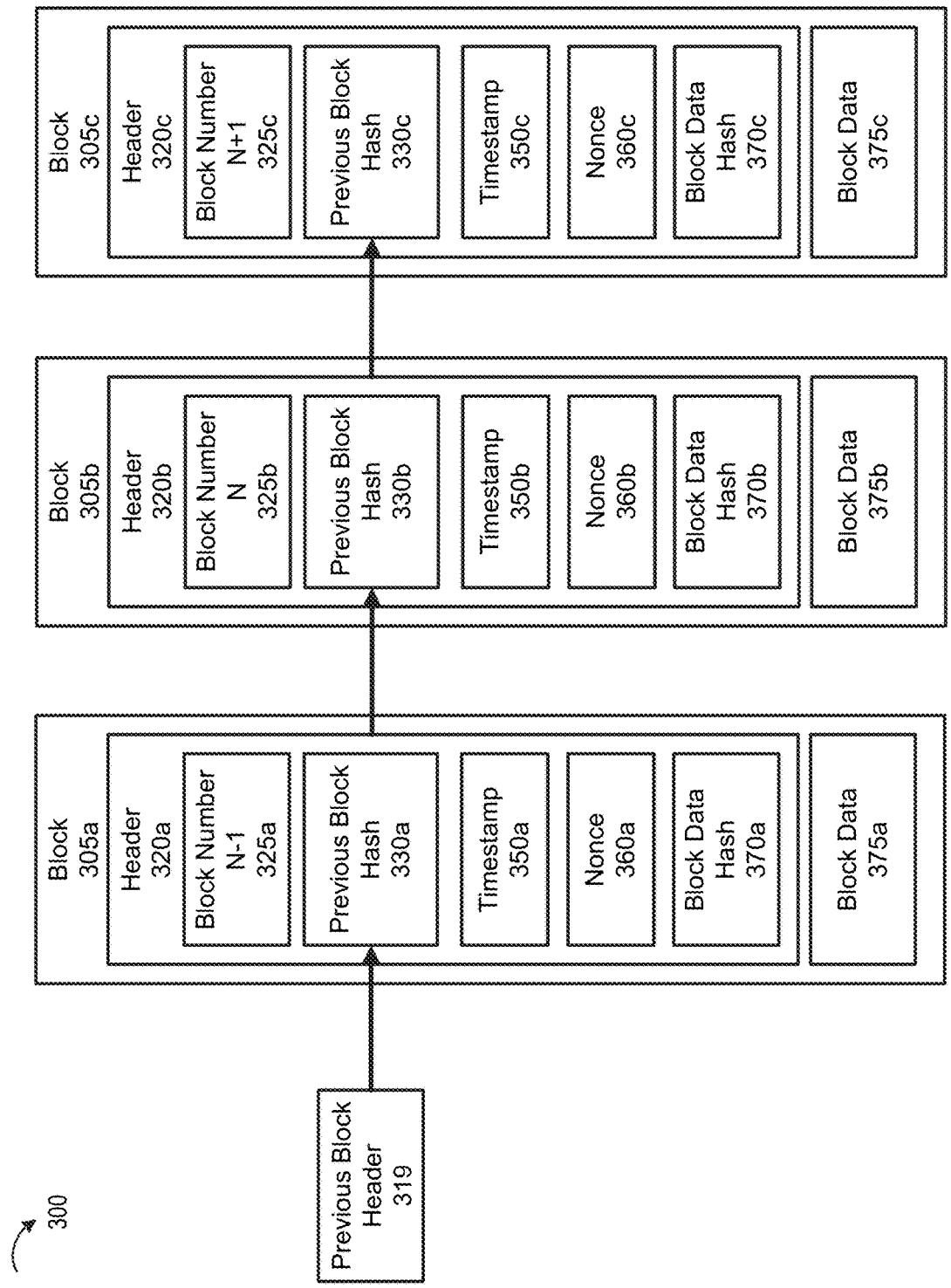
FIG. 3 illustrates an example blockchain according to an embodiment of the present disclosure.

As Discussed Above, a Blockchain 220 may be Associated with a Blockchain Network 200. FIG. 3 shows an example blockchain 300. The blockchain 300 may comprise a plurality of blocks 305a, 305b, and 305c (generally referred to as blocks 305). The blockchain 300 comprises a first block (not shown), sometimes referred to as the genesis block. Each of the blocks 305 may comprise a record of one or a plurality of submitted and validated transactions. The blocks 305 of the blockchain 300 may be linked together and cryptographically secured. In some cases, the post-quantum cryptographic algorithms that dynamically vary over time may be utilized to mitigate ability of quantum computing to break present cryptographic schemes. Examples of the various types of data fields stored in a blockchain block are provided below. A copy of the blockchain 300 may be stored locally, in the cloud, on grid, for example by the nodes 205b-e and 205g-h, as a file or in a database.

Blocks

Each of the blocks 305 may comprise one or more data fields. The organization of the blocks 305 within the blockchain 300 and the corresponding data fields may be implementation specific. As an example, the blocks 305 may comprise a respective header 320a, 320b, and 320c (generally referred to as headers 320) and block data 375a, 375b, and 375c (generally referred to as block data 375). The headers 320 may comprise metadata associated with their respective blocks 305. For example, the headers 320 may comprise a respective block number 325a, 325b, and 325c. As shown in FIG. 3, the block number 325a of the block 305a is N−1, the block number 325b of the block 305b is N, and the block number 325c of the block 305c is N+1. The headers 320 of the blocks 305 may include a data field comprising a block size, which may indicate the amount of data stored in a block (not shown). In some cases, the block size may be limited to a block size limit. The headers 320 of the blocks 305 may include block time stamps 350a-350c, which in addition to serving as a source of variation for the block hash, they also make it more difficult for an adversary to manipulate the blockchain 300.

The blocks 305 may be linked together and cryptographically secured. For example, the header 320b of the block N (block 305b) includes a data field (previous block hash 330b) comprising a hash representation of the previous block N−1's header 320a. Likewise, the header 320a of the block N−1 (block 305a) includes a data field (previous block hash 330a) comprising a hash representation of a previous block N−2's header 319. The hashing algorithm utilized for generating the hash representation may be, for example, a secure hashing algorithm 256 (SHA-256) which results in an output of a fixed length. In this example, the hashing algorithm is a one-way hash function, where it is computationally difficult to determine the input to the hash function based on the output of the hash function. Additionally, the header 320c of the block N+1 (block 305c) includes a data field (previous block hash 330c) comprising a hash representation of block N's (block 305b) header 320b.

The headers 320 of the blocks 305 may also include data fields comprising a hash representation of the block data, such as the block data hash 370a-c. The block data hash 370a-c may be generated, for example, by a Merkle tree and by storing the hash or by using a hash that is based on all of the block data. The headers 320 of the blocks 305 may comprise a respective nonce 360a, 360b, and 360c. In some implementations, the value of the nonce 360a-c is an arbitrary string that is concatenated with (or appended to) the hash of the block. The nonce 360 is generally solved for to mine a block. The headers 320 may comprise other data, such as a difficulty target.

The blocks 305 may comprise a respective block data 375a, 375b, and 375c (generally referred to as block data 375). The block data 375 may comprise a record of validated transactions that have also been integrated into the blockchain 200 via a consensus model (described below). As discussed above, the block data 375 may include a variety of different types of data in addition to validated transactions. Block data 375 may include any data, such as text, audio, video, image, or file, that may be represented digitally and stored electronically.

Blockchain Transaction

In one example, a blockchain based transaction may generally involve a transfer of data or value or an interaction between entities and described in more detail below. Referring back to FIG. 1, the first server 150 and/or the second server 152 may include one or more applications, for example, a transaction application configured to facilitate a blockchain transaction between entities. The entities may include users, devices, etc. The first user 110 may request or initiate a transaction with the second user 115 via a user application executing on the first client device 120. The transaction may be related to a transfer of value or data from the first user 110 to the second user 115. The value or data may represent money, a contract, property, records, rights, status, supply, demand, alarm, trigger, or any other asset that may be represented in digital form. The transaction may represent an interaction between the first user 110 and the second user 115.

Figure 4:
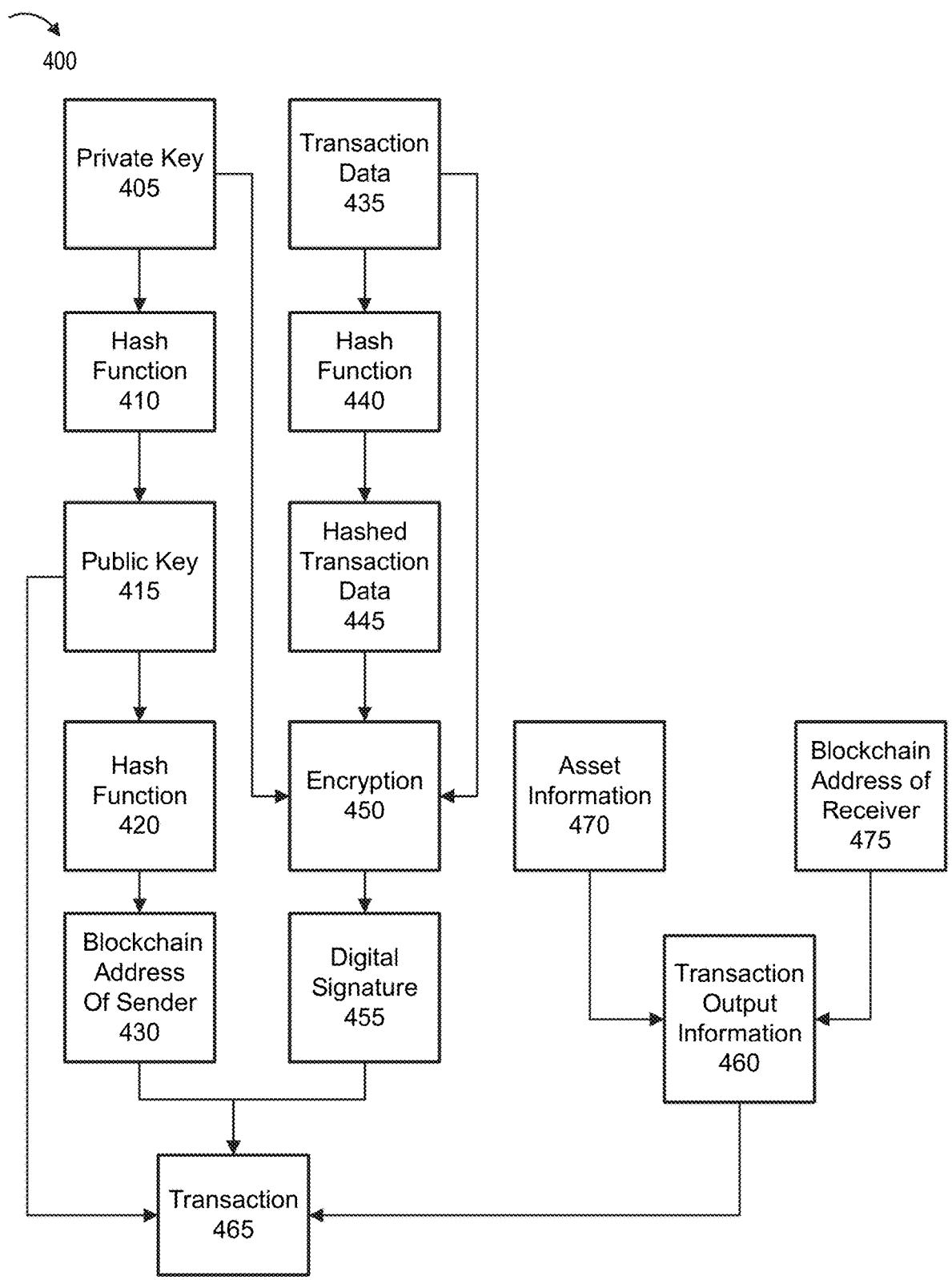
FIG. 4 is a diagram of an example transaction message according to an embodiment of the present disclosure.

FIG. 4 is a diagram of a transaction 465 generated by the transaction application. The transaction 465 may include a public key 415, a blockchain address 430 associated with the first user 110, a digital signature 455, and transaction output information 460. The transaction application may derive a public key 415 from a private key 405 of the first user 110 by applying a cryptographic hash function 410 to the private key 405. The cryptographic hash function 410 may be based on SHA-2 or SHA-3, although other cryptographic models may be utilized. More information about cryptographic algorithms may be found in Federal Information Processing Standards Publication (FIPS PUB 180-3), Secure Hash Standard. The transaction application may derive an address or identifier for the first user 110, such as the blockchain address 430, by applying a hash function 420 to the public key 415. Briefly, a hash function is a function that may be used for mapping arbitrary size data to fixed size data. The value may also be referred to as a digest, a hash value, a hash code, or a hash. In order to indicate that the first user 110 is the originator of the transaction 465, the transaction application may generate the digital signature 455 for the transaction data 435 using the private key 405 of the first user 110. The transaction data 435 may include information about the assets to be transferred and a reference to the sources of the assets, such as previous transactions in which the assets were transferred to the first user 110 or an identification of events that originated the assets. Generating the digital signature 455 may include applying a hash function 440 to the transaction data 435 resulting in hashed transaction data 445. The hashed transaction data 445 and the transaction data 435 may be encrypted (via an encryption function 450) using the private key 405 of the first user 110 resulting in the digital signature 455. The transaction output information 460 may include asset information 470 and an address or identifier for the second user 115, such as the blockchain address 475. The transaction 465 may be sent from the first client device 120 to the first server 150.

The specific type of cryptographic algorithm being utilized may vary dynamically based on various factors, such as a length of time, privacy concerns, etc. For example, the type of cryptographic algorithm being utilized may be changed yearly, weekly, daily, etc. The type of algorithms may also change based on varying levels of privacy. For example, an owner of content may implement a higher level of protection or privacy by utilizing a stronger algorithm.

Blockchain Addresses

A blockchain network may utilize blockchain addresses to indicate an entity using the blockchain or start and end points in the transaction. For example, a blockchain address for the first user 110, shown in FIG. 4 as the blockchain address of sender 430, may include an alphanumeric string of characters derived from the public key 415 of the first user 110 based on applying a cryptographic hash function 420 to the public key 415. The methods used for deriving the addresses may vary and may be specific to the implementation of the blockchain network. In some examples, a blockchain address may be converted into a QR code representation, barcode, token, or other visual representations or graphical depictions to enable the address to be optically scanned by a mobile device, wearables, sensors, cameras, etc. In addition to an address or QR code, there are many ways of identifying individuals, objects, etc. represented in a blockchain. For example, an individual may be identified through biometric information such as a fingerprint, retinal scan, voice, facial id, temperature, heart rate, gestures/movements unique to a person etc., and through other types of identification information such as account numbers, home address, social security number, formal name, etc.

Broadcasting Transaction

Figure 5:
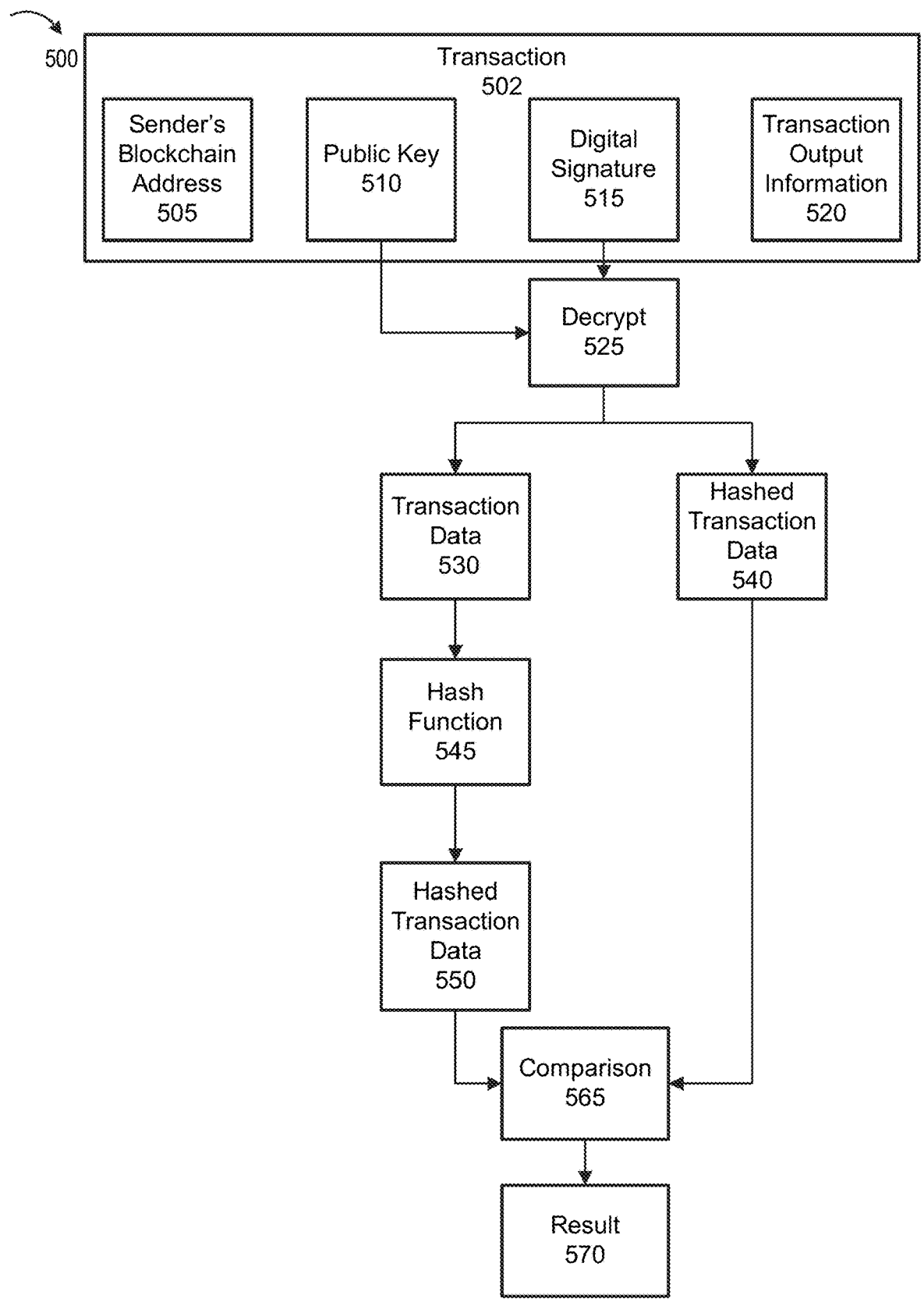
FIG. 5 shows an example transaction broadcast the blockchain network according to an embodiment of the present disclosure.

The first server 150 may receive transactions from users of the blockchain network 130. The transactions may be submitted to the first server 150 via desktop applications, smartphone applications, digital wallet applications, web services, or other software applications. The first server 150 may send or broadcast the transactions to the blockchain network 130. FIG. 5 shows an example transaction 502 broadcast by the first server 150 to the blockchain network 130. The transaction 502 may be broadcast to multiple nodes 205 of the blockchain network 130. Typically, once the transaction 502 is broadcast or submitted to the blockchain network 130, it may be received by one or more of the nodes 205. Once the transaction 502 is received by the one or more nodes 205 of the blockchain network 130, it may be propagated by the receiving nodes 205 to other nodes 205 of the blockchain network 130.

A blockchain network may operate according to a set of rules. The rules may specify conditions under which a node may accept a transaction, a type of transaction that a node may accept, a type of compensation that a node receives for accepting and processing a transaction, etc. For example, a node may accept a transaction based on a transaction history, reputation, computational resources, relationships with service providers, etc. The rules may specify conditions for broadcasting a transaction to a node. For example, a transaction may be broadcasted to one or more specific nodes based on criteria related to the node's geography, history, reputation, market conditions, docket/delay, technology platform. The rules may be dynamically modified or updated (e.g., turned on or off) to address issues such as latency, scalability and security conditions. A transaction may be broadcasted to a subset of nodes as a form of compensation to entities associated with those nodes (e.g., through receipt of compensation for adding a block of one or more transactions to a blockchain).

Transaction Validation—User Authentication and Transaction Data Integrity

Not all the full nodes 205 may receive the broadcasted transaction 502 at the same time, due to issues such as latency. Additionally, not all of the full nodes 205 that receive the broadcasted transaction 502 may choose to validate the transaction 502. A node 205 may choose to validate specific transactions, for example, based on transaction fees associated with the transaction 502. The transaction 502 may include a blockchain address 505 for the sender, a public key 510, a digital signature 515, and transaction output information 520. The node 205 may verify whether the transaction 502 is legal or conforms to a pre-defined set of rules. The node 205 may also validate the transaction 502 based on establishing user authenticity and transaction data integrity. User authenticity may be established by determining whether the sender indicated by the transaction 502 is in fact the actual originator of the transaction 502. User authenticity may be proven via cryptography, for example, asymmetric-key cryptography using a pair of keys, such as a public key and a private key. Additional factors may be considered when establishing user authenticity, such as user reputation, market conditions, history, transaction speed, etc. Data integrity of the transaction 502 may be established by determining whether the data associated with the transaction 502 was modified in any way. Referring back to FIG. 4, when the transaction application creates the transaction 465, it may indicate that the first user 110 is the originator of the transaction 465 by including the digital signature 455.

The node 205 may decrypt 525 the digital signature 515 using the public key 510. A result of the decryption may include hashed transaction data 540 and transaction data 530. The node 205 may generate hashed transaction data 550 based on applying a hash function 545 to the transaction data 530. The node 205 may perform a comparison 565 between the first hashed transaction data 540 and the second hashed transaction data 550. If the result 570 of the comparison 565 indicates a match, then the data integrity of the transaction 502 may be established and node 205 may indicate that the transaction 502 has been successfully validated. Otherwise, the data of the transaction 502 may have been modified in some manner and the node 205 may indicate that the transaction 502 has not been successfully validated.

Each full node 205 may build its own block and add validated transactions to that block. Thus, the blocks of different full nodes 205 may comprise different validated transactions. As an example, a full node 205a may create a first block comprising transactions "A," "B," and "C." Another full node 205b may create a second block comprising transactions "C," "D," and "E." Both blocks may include valid transactions. However, only one block may get added to the blockchain, otherwise the transactions that the blocks may have in common, such as transaction "C" may be recorded twice leading to issues such as double-spending when a transaction is executed twice. One problem that may be seen with the above example is that transactions "C," "D," and "E" may be overly delayed in being added to the blockchain. This may be addressed a number of different ways as discussed below.

Securing Keys

Private keys, public keys, and addresses may be managed and secured using software, such as a digital wallet. Private keys may also be stored and secured using hardware. The digital wallet may also enable the user to conduct transactions and manage the balance. The digital wallet may be stored or maintained online or offline, and in software or hardware or both hardware and software. Without the public/private keys, a user has no way to prove ownership of assets. Additionally, anyone with access to a user's public/private keys may access the user's assets. While the assets may be recorded on the blockchain, the user may not be able to access them without the private key.

Tokens

A token may refer to an entry in the blockchain that belongs to a blockchain address. The entry may comprise information indicating ownership of an asset. The token may represent money, a contract, property, records, access rights, status, supply, demand, alarm, trigger, reputation, ticket, or any other asset that may be represented in digital form. For example, a token may refer to an entry related to cryptocurrency that is used for a specific purpose or may represent ownership of a real-world asset, such as Fiat currency or real-estate. Token contracts refer to cryptographic tokens that represent a set of rules that are encoded in a smart contract. The person that owns the private key corresponding to the blockchain address may access the tokens at the address. Thus, the blockchain address may represent an identity of the person that owns the tokens. Only the owner of the blockchain address may send the token to another person. The tokens may be accessible to the owner via the owner's wallet. The owner of a token may send or transfer the token to a user via a blockchain transaction. For example, the owner may sign the transaction corresponding to the transfer of the token with the private key. When the token is received by the user, the token may be recorded in the blockchain at the blockchain address of the user.

Establishing User Identity

While a digital signature may provide a link between a transaction and an owner of assets being transferred, it may not provide a link to the real identity of the owner. In some cases, the real identity of the owner of the public key corresponding to the digital signature may need to be established. The real identity of an owner of a public key may be verified, for example, based on biometric data, passwords, personal information, etc. Biometric data may comprise any physically identifying information such as fingerprints, face and eye images, voice sample, DNA, human movement, gestures, gait, expressions, heart rate characteristics, temperature, etc.

Publishing and Validating a Block

As discussed above, full nodes 205 may each build their own blocks that include different transactions. A node may build a block by adding validated transactions to the block until the block reaches a certain size that may be specified by the blockchain rules. However, only one of the blocks may be added to the blockchain. The block to be added to the blockchain and the ordering of the blocks may be determined based on a consensus model. In a proof of work model, nodes may compete to add their respective block to the blockchain by solving a complex mathematical puzzle. For example, such a puzzle may include determining a nonce 360, as discussed above, such that a hash (using a predetermined hashing algorithm) of the block to be added to the blockchain (including the nonce) has a value that meets a range limitation (e.g., a certain number of leading zeros in the hash). If two or more nodes solve the puzzle at the same time, then a "fork" may be created. When a full node 205 solves the puzzle, it may publish its block to be validated by the validation nodes 205 of the blockchain network 130.

In a proof of work consensus model, a node validates a transaction, for example, by running a check or search through the current ledger stored in the blockchain. The node will create a new block for the blockchain that will include the data for one or more validated transactions (see, e.g., block 375 of FIG. 3). In a blockchain implementation such as Bitcoin, the size of a block is constrained. Referring back to FIG. 3, in this example, the block will include a Previous Block Hash 330 representing a hash of what is currently the last block in the blockchain. The block may also include a hash 370 of its own transaction data (e.g., a so-called Merkle hash). According to a particular algorithm, all or selected data from the block may be hashed to create a final hash value. According to an embodiment of the proof of work model, the node will seek to modify the data of the block so that the final hash value is meets pre-set criteria (e.g., is less than a preset value, has a certain number of leading zeros, etc.). This is achieved through addition of a data value referred to as a nonce 360. Because final hash values cannot be predicted based on its input, it is not possible to compute an appropriate value for the nonce 360 that will result in a final hash value that meets the pre-set criteria. Accordingly, in this embodiment, a computationally intensive operation is needed at the node to determine an appropriate nonce value through a "brute force" trial-and-error method. Once a successful nonce value is determined, the completed block is published to the blockchain network for validation.

If validated by a majority of the nodes in the blockchain network, the completed block is added to the blockchain at each participating node. When a node's block is not added to the blockchain, the block is discarded and the node proceeds to build a new block. The transactions that were in the discarded block may be returned to a queue (e.g., mempool) and wait to be added to a next block. When a transaction is discarded or returned to the queue, the assets associated with the discarded transaction are not lost, since a record of the assets will exist in the blockchain. However, when a transaction is returned to the queue, it causes a delay in completing the transaction. Reducing the time to complete a transaction may be important. A set of blockchain rules, or renumeration/compensation for a node to process the returned transaction may determine how a returned transaction is to be treated going forward. When a transaction is put into a pool, then it can have a priority level but then a rule may indicate that the transaction priority level must exceed a threshold level. The priority level of a returned or discarded transaction may be increased. Another way to reduce the time to complete a transaction is to have the system, service provider, participant in the transaction, or merchant pay additional incentive for nodes to process a returned transaction. As an example, a service provider may identify a network of preferred miners based on geography or based on a volume discount perspective. The time to complete a transaction may be optimized by routing a returned transaction to specific preferred nodes. A transaction may be associated with an address that limits which of the preferred nodes will get to process the transaction if it is returned due to its inclusion in a discarded block. A value may be associated with the transaction so that it goes to preferred miners in a specific geographic location. Additionally, returned transactions may be processed based on pre-set rules. For example, a rule may indicate a commitment to process a specific number of returned transactions to receive additional incentive or compensation.

Blockchain Confirmations

After a block comprising a transaction is added to a blockchain, a blockchain confirmation may be generated for the transaction. The blockchain confirmation may be a number of blocks added to the blockchain after the block that includes the transaction. For example, when a transaction is broadcasted to the blockchain, there be no blockchain confirmations associated with the transaction. If the transaction is not validated, then the block comprising the transaction will not be added to the blockchain and the transaction will continue to have no blockchain confirmations associated with it. However, if a block comprising the transaction is validated, then each of the transactions in the block will have a blockchain confirmation associated with the transaction. Thus, a transaction in a Hock will have one blockchain confirmation associated with it when the block is validated. When the block is added to the blockchain, each of the transactions in the block will have two blockchain confirmations associated with it. As additional validated blocks are added to the blockchain, the number of blockchain confirmations associated with the block will increase. Thus, the number of blockchain confirmations associated with a transaction may indicate a difficulty of overwriting or reversing the transaction. A higher valued transaction may require a larger number of blockchain confirmations before the transaction is executed.

Consensus Models

As discussed above, a blockchain network may determine which of the full nodes 205 publishes a next block to the blockchain. In a permissionless blockchain network, the nodes 205 may compete to determine which one publishes the next block. A node 205 may be selected to publish its block as the next block in the blockchain based on a consensus model. For example, the selected or winning node 205 may receive a reward, such as a transaction fee, for publishing its block, for example. Various consensus models may be used, for example, a proof of work model, a proof of stake model, a delegated proof of stake model, a round robin model, proof of authority or proof of identity model, and proof of elapsed time model.

In a proof of work model, a node may publish the next block by being the first to solve a computationally intensive mathematical problem (e.g., the mathematical puzzle described above). The solution serves as "proof" that the node expended an appropriate amount of effort in order to publish the block. The solution may be validated by the full nodes before the block is accepted. The proof of work model, however, may be vulnerable to a 51% attack described below.

The proof of stake model is generally less computationally intensive than the proof of work model. Unlike the proof of work model which is open to any node having the computational resources for solving the mathematical problem, the proof of stake model is open to any node that has a stake in the system. The stake may be an amount of cryptocurrency that the blockchain network node (user) may have invested into the system. The likelihood of a node publishing the next block may be proportional to its stake. Since this model utilizes fewer resources, the blockchain may forego a reward as incentive for publishing the next block.

The round robin model is generally used by permissioned blockchain networks. Using this model, nodes may take turns to publish new blocks.

In the proof of elapsed time model, each publishing node requests a wait time from a secure hardware within their computer system. The publishing node may become idle for the duration of the wait time and then creates and publishes a block to the blockchain network. As an example, in cases where there is a need for speed and/or scalability (e.g., in the context of a corporate environment), a hybrid blockchain network may switch to be between completely or partially permissioned and permissionless. The network may switch based on various factors, such as latency, security, market conditions, etc.

Forks

As discussed above, consensus models may be utilized for determining an order of events on a blockchain, such as which node gets to add the next block and which node's transaction gets verified first. When there is a conflict related to the ordering of events, the result may be a fork in the blockchain. A fork may cause two versions of the blockchain to exist simultaneously. Consensus methods generally resolve conflicts related to the ordering of events and thus, prevent forks from occurring. In some cases, a fork may be unavoidable. For example, with a proof of work consensus model, only one of the nodes competing to solve a puzzle may win by solving its puzzle first. The winning node's block is then validated by the network. If the winning node's block is successfully validated by the network, then it will be the next block added to the blockchain. However, it may be the case that two nodes may end up solving their respective puzzles at the same time. In such a scenario, the blocks of both winning nodes may be broadcasted to the network. Since different nodes may receive notifications of a different winning node, the nodes that receive notification of the first node as the winning node may add the first node's block to their copy of the blockchain. Nodes that receive notification of the second node as the winning node may add the second node's block to their copy of the blockchain. This results in two versions of the blockchain or a "fork." This type of fork may be resolved by the longest chain rule of the proof of work consensus model. According to the longest chain rule, if two versions of the blockchain exist, then the chain with a larger number of blocks may be considered to be the valid blockchain. The other version of the blockchain may be considered as invalid and discarded or orphaned. Since the blocks created by different nodes may include different transactions, a fork may result in a transaction being included in one version of the blockchain and not the other. The transactions that are in a block of a discarded blockchain may be returned to a queue and wait to be added to a next block.

In some cases, forks may result from changes related to the blockchain implementation, for example, changes to the blockchain protocols and/or software. Forks may be more disruptive for permissionless and globally distributed blockchain networks than for private blockchain networks due to their impact on a larger number of users. A change or update to the blockchain implementation that is backwards compatible may result in a soft fork. When there is a soft fork, some nodes may execute an update to the blockchain implementation while other nodes may not. However, nodes that do not update to the new blockchain implementation may continue to transact with updated nodes.

A change to the blockchain implementation that is not backwards compatible may result in a hard fork. While hard forks are generally intentional, they may also be caused by unintentional software bugs/errors. In such a case, all publishing nodes in the network may need to update to the new blockchain implementation. While publishing nodes that do not update to the new blockchain implementation may continue to publish blocks according to the previous blockchain implementation, these publishing nodes may reject blocks created based on the new blockchain implementation and continue to accept blocks created based on the previous blockchain implementation. Therefore, nodes on different hard fork versions of the blockchain may not be able to interact with one another. If all nodes move to the new blockchain implementation, then the previous version may be discarded or abandoned. However, it may not be practical or feasible to update all nodes in the network to a new blockchain implementation, for example, if the update invalidates specialized hardware utilized by some nodes.

Blockchain-Based Application: Cryptocurrency

Cryptocurrency is a medium of exchange that may be created and stored electronically in a blockchain, such as a the blockchain 130a in FIG. 1. Bitcoin is one example of cryptocurrency, however there are several other cryptocurrencies. Various encryption techniques may be used for creating the units of cryptocurrency and verifying transactions. As an example, the first user 110 may own 10 units of a cryptocurrency. The blockchain 130a may include a record indicating that the first user 110 owns the 10 units of cryptocurrency. The first user 110 may initiate a transfer of the 10 units of cryptocurrency to the second user 115 via a wallet application executing on the first client device 120. The wallet application may store and manage a private key of the first user 110. Examples of the wallet device include a personal computer, a laptop computer, a smartphone, a personal data assistant (PDA), etc.

Figure 6A:
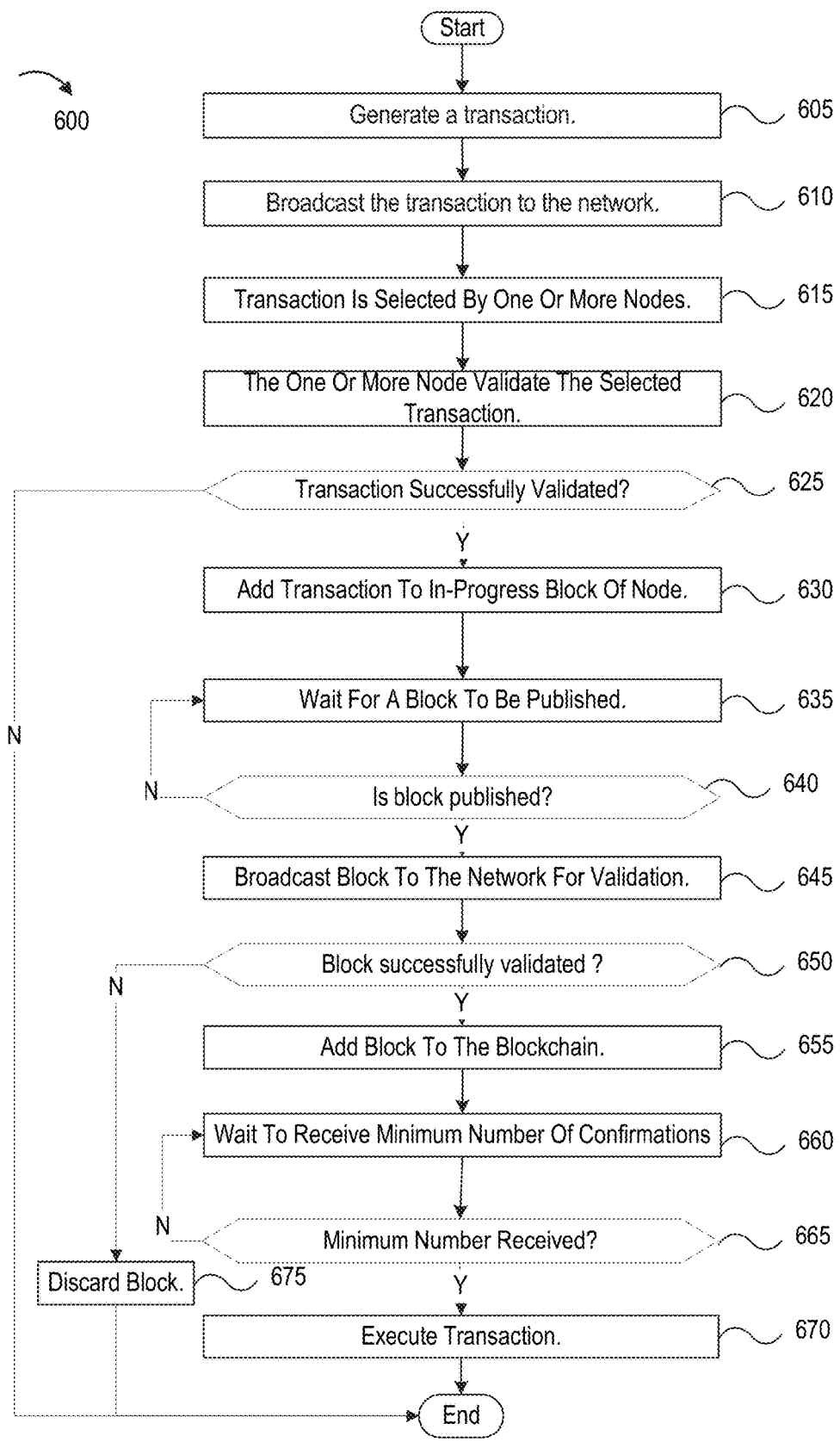
FIG. 6A is a flowchart showing an example process for performing a blockchain based transaction according to an embodiment of the present disclosure.

FIG. 6A is a flow diagram showing steps of an example method 600 for performing a blockchain transaction between entities, such as the first user 110 of the first client device 120 and the second user 115 of the second client device 125 in FIG. 1. The steps of the method 600 may be performed by any of the computing devices shown in FIG. 1. Alternatively or additionally, some or all of the steps of the method 600 may be performed by one or more other computing devices. Steps of the method 600 may be modified, omitted, and/or performed in other orders, and/or other steps may be added.

At step 605, the wallet application may generate transaction data for transferring the 10 units of cryptocurrency from the first user 110 to the second user 115. The wallet application may generate a public key for the transaction using the private key of the first user 110. In order to indicate that the first user 110 is the originator of the transaction, a digital signature may also be generated for the transaction using the private key of the first user 110. As discussed with reference to FIG. 4, the transaction data may include information, such as a blockchain address of the sender 430, the digital signature 455, transaction output information 460, and the public key of the sender 415. The transaction data may be sent to the first server 150 from the first client device 120.

The first server 150 may receive the transaction data from the first client device 120. At step 610, the first server 150 may broadcast the transaction to the blockchain network 130a. The transaction may be received by one or more nodes 205 of the blockchain network 130a. At step 615, upon receiving the transaction, a node 205 may choose to validate the transaction, for example, based on transaction fees associated with the transaction. If the transaction is not selected for validation by any of the nodes 205, then the transaction may be placed in a queue and wait to be selected by a node 205.

At step 620, each of the nodes 205 that selected the transaction may validate the transaction. Validating the transaction may include determining whether the transaction is legal or conforms to a pre-defined set of rules for that transaction, establishing user authenticity, and establishing transaction data integrity. At step 625, if the transaction is successfully validated by a node 205, the validated transaction is added to a block being constructed by that node 205 (step 630). As discussed above, since different nodes 205 may choose to validate different transactions, different nodes 205 may build or assemble a block comprising different validated transactions. Thus, the transaction associated with the first user 110 transferring 10 units of cryptocurrency to the second user 115 may be included in some blocks and not others.

At step 635, the blockchain network 130a may wait for a block to be published. Validated transactions may be added to the block being assembled by a node 205 until it reaches a minimum size specified by the blockchain or a block size limit. If the blockchain network 130a utilizes a proof of work consensus model, then the nodes 205 may compete for the right to add their respective blocks to the blockchain by solving a complex mathematical puzzle. The node 205 that solves its puzzle first wins the right to publish its block. As compensation, the winning node may be awarded a transaction fee associated with the transaction (e.g., from the wallet of the first user 110). Alternatively, or in addition, the winning node may be awarded compensation as an amount of cryptocurrency added to an account associated with the winning node from the blockchain network (e.g., "new" units of cryptocurrency entering circulation). This latter method of compensation and releasing new units of cryptocurrency into circulation is sometimes referred to as "mining." At step 640, if a block has not been published, then the process 600 returns to step 635 and waits for a block to be published. However, at step 640, if a block has been published, then the process 600 proceeds to step 645.

At step 645, the published block is broadcasted to the blockchain network 130a for validation. At step 650, if the block is validated by a majority of the nodes 205, then at step 655, the validated block is added to the blockchain 220. However, at step 650, if the block is not validated by a majority of the nodes 205, then the process 600 proceeds to step 675. At step 675, the block is discarded and the transactions in the discarded block are returned back to the queue. The transactions in the queue may be selected by one or more nodes 205 for the next block. The node 205 that built the discarded block may build a new next block.

At step 660, if the transaction was added to the blockchain 220, the first server 150 may wait to receive a minimum number of blockchain confirmations for the transaction. At step 665, if the minimum number of confirmations for the transaction have not been received, then the process may return to step 660. However, if at step 665, the minimum number of confirmations have been received, then the process proceeds to step 670. At step 670, the transaction may be executed and assets from the first user 110 may be transferred to the second user 115. For example, the 10 units of cryptocurrency owned by the first user 110 may be transferred from a financial account of the first user 110 to a financial account of the second user 115 after the transaction receives at least three confirmations.

Smart Contracts

A smart contract is an agreement that is stored in a blockchain and automatically executed when the agreement's predetermined terms and conditions are met. The terms and conditions of the agreement may be visible to other users of the blockchain. When the pre-defined rules are satisfied, then the relevant code is automatically executed. The agreement may be written as a script using a programming language such as Java, C++, JavaScript, VBScript, PHP, Perl, Python, Ruby, ASP, Tcl, etc. The script may be uploaded to the blockchain as a transaction on the blockchain.

As an example, the first user 110 (also referred to as tenant 110) may rent an apartment from the second user 115 (also referred to as landlord 115). A smart contract may be utilized between the tenant 110 and the landlord 115 for payment of the rent. The smart contract may indicate that the tenant 110 agrees to pay next month's rent of $1000 by the 28$^{th}$ of the current month. The agreement may also indicate that if the tenant 110 pays the rent, then the landlord 115 provides the tenant 110 with an electronic receipt and a digital entry key to the apartment. The agreement may also indicate that if the tenant 110 pays the rent by the 28$^{th}$ of the current month, then on the last day of the current month, both the entry key and the rent are released respectively to the tenant 110 and the landlord 115.

Figure 6B:
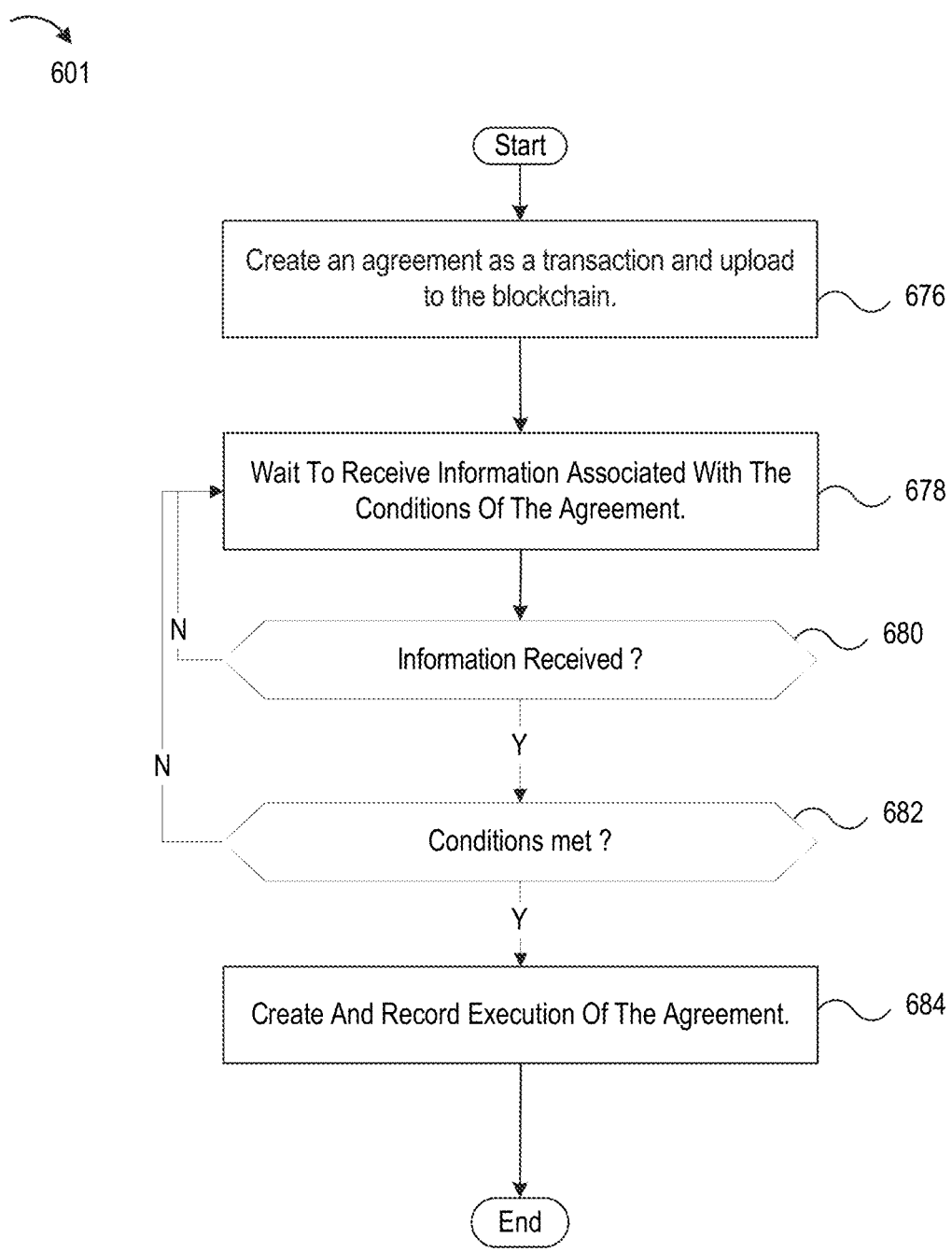
FIG. 6B is a flowchart showing another example process for performing a blockchain based transaction according to an embodiment of the present disclosure.

FIG. 6B is a flow diagram showing steps of an example method 601 for performing a smart contract transaction between entities, such as the tenant 110 and the landlord 115. The steps of the method 601 may be performed by any of the computing devices shown in FIG. 1. Alternatively or additionally, some or all of the steps of the method 601 may be performed by one or more other computing devices. Steps of the method 601 may be modified, omitted, and/or performed in other orders, and/or other steps may be added.

At step 676, the agreement or smart contract between the tenant 110 and the landlord 115 may be created and then submitted to the blockchain network 130a as a transaction. The transaction may be added to a block that is mined by the nodes 205 of the blockchain network 130a, the block comprising the transaction may be validated by the blockchain network 130a and then recorded in the blockchain 220 (as shown in steps 610-655 in FIG. 6A). The agreement associated with the transaction may be given a unique address for identification.

At step 678, the process 601 waits to receive information regarding the conditions relevant for the agreement. For example, the process 601 may wait to receive notification that $1000 was sent from a blockchain address associated with the tenant 110 and was received at a blockchain address associated with the landlord 115 by the 28$^{th}$ of the current month. At step 680, if such a notification is not received, then the process 601 returns to step 678. However, if at step 680, a notification is received, then the process 601 proceeds to step 682.

At step 682, based on determining that the received notification satisfies the conditions needed to trigger execution of the various terms of the smart contract, the process 601 proceeds to step 684. However, at step 682, if it is determined that the received notification does not satisfy the conditions needed to trigger execution of the smart contract, then the process 601 returns to step 678. At step 684, the process 601 creates and records a transaction associated with execution of the smart contract. For example, the transaction may include information of the payment received, the date the payment was received, an identification of the tenant 110 and an identification of the landlord 115. The transaction may be broadcast to the blockchain network 130a and recorded in the blockchain 220 (as shown in steps 610-655 of the process 600 of FIG. 6A). If the transaction is successfully recorded in the blockchain 220, the transaction may be executed. For example, if the payment was received on the 28$^{th}$, then an electronic receipt may be generated and sent to the tenant 110. However, on the last day of the current month, both the digital entry key and the rent are released respectively to the tenant 110 and the landlord 115.

Smart contracts may execute based on data received from entities that are not on the blockchain or off-chain resources. For example, a smart contract may be programmed to execute if a temperature reading from a smart sensor or IoT sensor falls below 10 degrees. Smart contracts are unable to pull data from off-chain resources. Instead, such data needs to be pushed to the smart contract. Additionally, even slight variations in data may be problematic since the smart contract is replicated across multiple nodes of the network. For example, a first node may receive a temperature reading of 9.8 degrees and a second node may receive a temperature reading of 10 degrees. Since validation of a transaction is based on consensus across nodes, even small variations in the received data may result in a condition of the smart contract to be evaluated as being not satisfied. Third party services may be utilized to retrieve off-chain resource information and push this to the blockchain. These third-party services may be referred to as oracles. Oracles may be software applications, such as a big data application, or hardware, such as an IoT or smart device. For example, an oracle service may evaluate received temperature readings beforehand to determine if the readings are below 10 degrees and then push this information to the smart contract. However, utilizing oracles may introduce another possible point of failure into the overall process. Oracles may experience errors, push incorrect information or may even go out of business.

Since blockchains are immutable, amending or updating a smart contract that resides in a blockchain may be challenging and thus, more expensive and/or more restrictive than with text-based contracts.

Internet of Things (IoT)

An IoT network may include devices and sensors that collect data and relay the data to each other via a gateway. The gateway may translate between the different protocols of the devices and sensors as well as manage and process the data. IoT devices may, for example, collect information from their environments such as motions, gestures, sounds, voices, biometric data, temperature, air quality, moisture, and light. The collected information sent over the Internet for further processing. Typically, IoT devices use a low power network, Bluetooth, WiFi, or satellite to connect to the Internet or "the cloud". Some IoT related issues that blockchain may be able to detect include a lack of compliance in the manufacturing stage of an IoT device. For example, a blockchain may track whether an IoT device was adequately tested.

As discussed above, information from off-chain resources, including IoT devices, may be pushed to smart contracts via third party entities known as oracles. As an example, a smart refrigerator may monitor the use of an item stored in the refrigerator, such as milk. Various sensors within the refrigerator may be utilized for periodically determining an amount of milk stored in the refrigerator. A smart contract stored in a blockchain may indicate that if the weight of the stored milk falls below 10 ounces, then a new carton of milk is automatically purchased and delivered. The refrigerator sensors may periodically send their readings to a third-party service or oracle. The oracle may evaluate the sensor readings to determine whether the conditions for purchasing a new carton of milk have been met. Upon determining that the weight of the stored milk is below 10 ounces, the oracle may push information to the smart contract indicating that the condition for executing the smart contract has been met. The smart contract may be executed and a new carton of milk may be automatically purchased. Both the execution of the smart contract and the purchase of the new carton may be recorded in the blockchain. In some cases, the condition may be an occurrence of an event, such as a need or anticipated need, or convenience factors, such as a delivery day, cost, promotions, or incentives.

Some issues related to the integration of blockchain into IoT include speed of transactions and computational complexity. The speed at which transactions are executed on the blockchain may be important when IoT networks with hundreds or thousands of connected devices are all functioning and transacting simultaneously. IoT devices are generally designed for connectivity rather than computation and therefore, may not have the processing power to support a blockchain consensus algorithm, such as proof of work. IoT devices also tend to be vulnerable to hacking via the Internet and/or physical tampering. For example, IoT devices may be more vulnerable to DDoS and malware attacks. Hackers may target a specific network and begin spamming the network with traffic within a short amount of time. Because of the increased surge in traffic, the bandwidth may be quickly overloaded, and the entire system may crash.

Supply Chain Monitoring and Logistics

A supply chain for a product may include a network of entities and activities that are involved in the creation of the product and its eventual sale to a customer. A blockchain based record of the supply chain for a product may be utilized, for example, to trace the provenance of parts and materials and to prevent counterfeit parts from entering the supply chain. Blockchain integration into the supply chain for a product may utilize IoT devices and data, oracles, and smart contracts. For example, an RFID tag may be attached to a product in order to physically track the product and record its location within the supply chain. Additionally, smart contracts may be utilized to record the various activities and interactions between entities that are involved in the product's supply chain. As discussed above with reference to FIGS. 6A and 6B, any data or information that may be digitally represented and electronically stored may be recorded in a blockchain by submitting the data as part of a blockchain transaction. When the transaction is included in a validated block that is added to the blockchain, the transaction and its associated data is recorded in the blockchain.

As an example, a permissioned blockchain may be utilized for recording and monitoring the entities and activities involved in food distribution, such as fruit or vegetables. The blockchain may be accessible to entities, such as the suppliers of seed and pesticides, farmers, distributors, grocery stores, customers, and regulators. The blockchain may record activities such as the sale of a pesticide and/or seed to the farmer, the harvesting and packaging of the fruit, its shipment to distributors' warehouses, its arrival at various stores, and eventual purchase by a consumer. Sensors and RFID devices may be utilized for tracking the fruit through the supply chain. For example, the fruit may be packaged in crates tagged with a unique RFID device. When the tagged crate is loaded onto a truck for shipment from the farm to a distributor, the crate may be scanned, and a record of its shipment may be uploaded to the blockchain. When the crate arrives at a warehouse, it may be scanned again and a record of its arrival at the warehouse may be uploaded to the blockchain. Additionally, smart contracts may be executed throughout the supply chain. For example, when the crate is scanned at the warehouse, a smart contract between the farmer and the warehouse may be executed indicating that the crate was successfully shipped from the farmer to the warehouse and received by the warehouse.

As another example, a permissioned blockchain for an automobile may store a record of entities and activities related to a component that is utilized in the manufacturing of the automobile. The blockchain may be accessible to various entities, such as automobile OEMs, distributors and suppliers of materials and components, dealerships, mechanics, insurance providers, and others. While evaluating an accident involving a policy holder's automobile, first user 110 (an insurance provider 110 in this example) may determine that the accident may have been caused by a defective component used in a wheel of the automobile. The insurance provider 110 may wish to trace a provenance of the component based on information recorded in the permissioned blockchain. The insurance provider 110 may query the blockchain data for information related to the component via, for example, a blockchain querying application executing on the first client device 120. The query may include identifying information associated with the component. For example, the component may be marked with an identification that is unique to the component or a group of components. The results of the query may include records in the blockchain of the entities and activities that were involved in the creation of the component and its eventual sale to the automobile manufacturer.

Blockchain Enabled In-Store Purchasing

Figure 8:
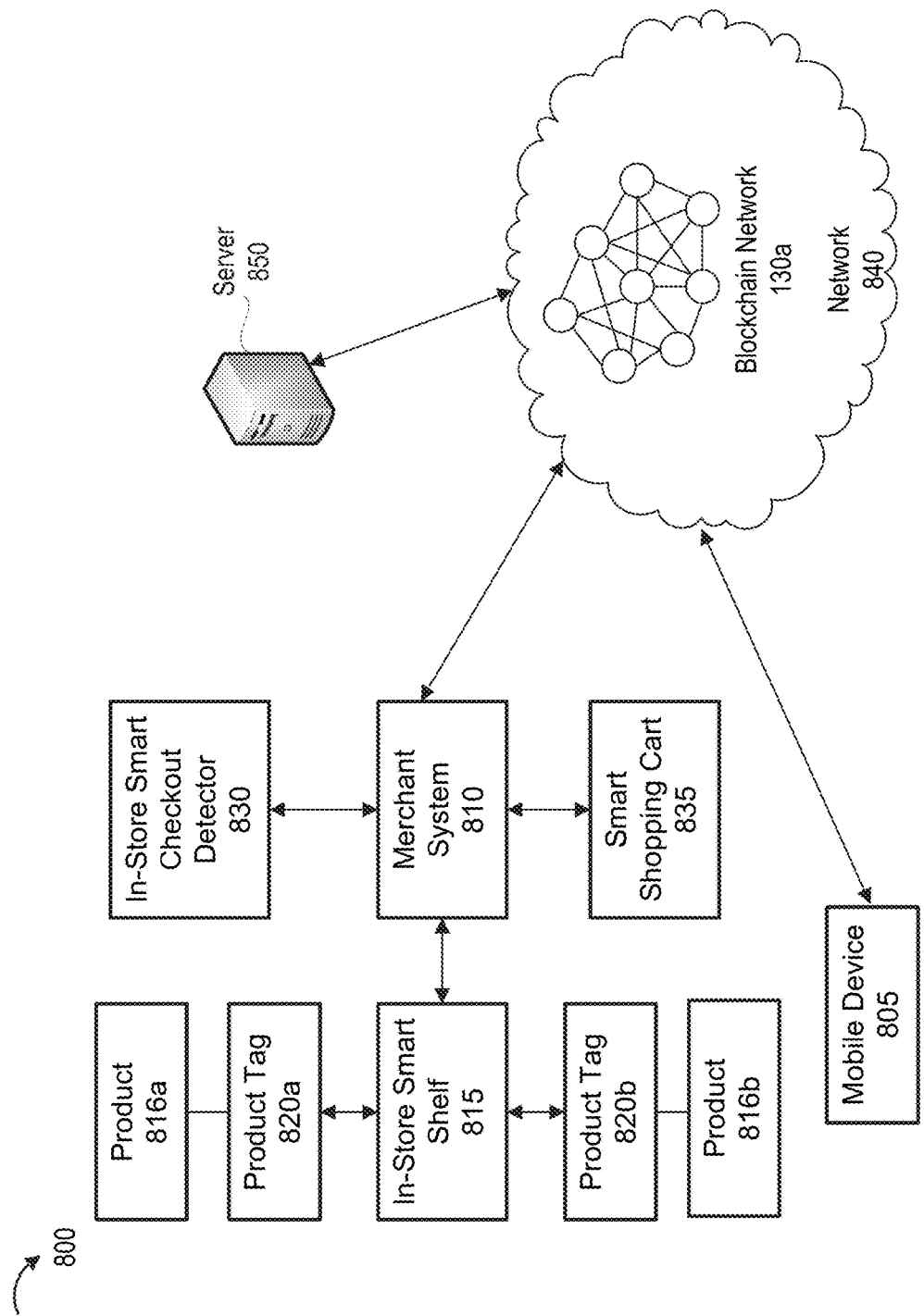
FIG. 8 illustrates an example of a blockchain enabled in-store purchase system according to an embodiment of the present disclosure.

An example of blockchain enabled in-store purchasing is described with reference to the system 800 shown in FIG. 8, the process 600 shown in FIG. 6A and the process 601 shown in FIG. 6B. FIG. 8 illustrates an example of a blockchain enabled in-store purchase system 800. The system 800 includes a mobile device 805, a merchant system 810, and a server 850 connected via a network 840. The merchant system 810 may be connected via a local wireless network to various IoT devices within a store, for example, an in-store smart shelf 815, and an in-store smart checkout detector 830.

The store may include one or more smart shelves, such as the in-store smart shelf 815. The smart shelf 815 may include an RFID tag, an RFID reader, and an antenna. One or more products may be stored on the in-store smart shelf 815. Each product may include an RFID tag, such as a first product tag 820a attached to a first product 816a and a second product tag 820b attached to a second product 816b. The in-store smart shelf 815 may, based on reading the product tags 820a and 820b, send information about the products 816a and 816b throughout the day to the merchant system 810. The merchant system 810 may in turn update an inventory of products currently within the store.

A shopper may travel through the store with the mobile device 805. A digital shopping list on the mobile device 805 may include a list of items that the shopper may need to purchase. For example, the shopping list may include an item that matches the first product 816a. When the shopper is close to the in-store smart shelf 815, the mobile device 805 may notify the shopper that the first product 816a is currently available on the in-store smart shelf 815. The shopper may remove the first product 816a from the in-store smart shelf 815 and place it into a smart shopping cart 835. The smart shopping cart 835 may read the first product tag 820a as well as the product tags attached to other products that may have been placed in the smart shopping cart 835. When the shopper is ready to checkout, the shopper may walk out of the store with the shopping cart 835. As the shopper walks out of the store, the in-store smart checkout detector 830 may detect the smart shopping cart 835. The smart shopping cart 835 may communicate with the in-store smart checkout detector 830 and transmit information about the products in the smart shopping cart. The in-store smart checkout detector 830 may send information about the products, such as the first product 816a, and payment information from the mobile device 805 to the merchant system 810. The merchant system 810 may receive information from the in-store smart checkout detector 830 and the payment information and proceed to initiate purchase of the first product 816a.

Referring to step 605 of the process 600 shown in FIG. 6A, a wallet application on the mobile device 805 may generate transaction data for transferring an amount of cryptocurrency matching the sale price of the first product 816a from the shopper to the merchant. The wallet application may generate a public key for the transaction using the private key of the shopper. In order to indicate that the shopper is the originator of the transaction, a digital signature may also be generated for the transaction using the private key of the shopper. The transaction data may be sent to the server 850 from the mobile device 805.

The server 850 may receive the transaction data from the mobile device 805. At step 610, the server 850 may broadcast the transaction to the blockchain network 130a. The transaction may be received by one or more nodes 205 of the blockchain network 130a. At step 615, upon receiving the transaction, a node 205 may choose to validate the transaction, for example, based on transaction fees associated with the transaction. If the transaction is not selected for validation by any of the nodes 205, then the transaction may be placed in a queue and wait to be selected by a node 205.

At step 620, each of the nodes 205 that selected the transaction may validate the transaction. At step 625, if the transaction is successfully validated by a node 205, the validated transaction is added, at step 630, to a block being constructed by that node 205. At step 635, the blockchain network 130a may wait for a block to be published. At step 640, if a block has not been published, then the process 600 returns to step 635 and waits for a block to be published. However, at step 640, if a block has been published, then the process 600 proceeds to step 645.

At step 645, the published block is broadcasted to the blockchain network 130a for validation. At step 650, if the block is validated by a majority of the nodes 205, then at step 655, the validated block is added to the blockchain 220. At step 660, if the transaction was added to the blockchain 220, the server 850 may wait to receive a minimum number of blockchain confirmations for the transaction. At step 665, if the minimum number of confirmations for the transaction have not been received, then the process may return to step 660. However, if at step 665, the minimum number of confirmations have been received, then the process proceeds to step 670. At step 670, the transaction may be executed and the sale price of the first product 816a may be transferred from the shopper to the merchant.

When the in-store smart checkout detector 830 sends information about the products, such as the first product 816a, and payment information from the mobile device 805 to the merchant system 810, a smart contract may be created between the shopper and the merchant and executed according to the process 601 shown in FIG. 6B. For example, at step 676, a smart contract between the shopper and the merchant may be created and then submitted to the blockchain network 130a as a transaction. For example, at step 678, the process 601 may wait to receive notification that an amount of cryptocurrency equal to the sale price of the first product 816a was sent from a blockchain address associated with the shopper and was received at a blockchain address associated with the merchant by the time the first product 816a is removed from the smart shopping cart 835. If the payment for the first product 816a was successfully transferred from the shopper to the merchant by the time the shopper removes the first product 816a from the smart shopping cart 835, then an electronic receipt may be generated and sent to the shopper. Otherwise, the merchant system 815 may be alerted that the shopper is attempting to leave the premises without paying for the first product 816a.

Blockchain Enabled In-Vehicle Purchasing

Figure 9:
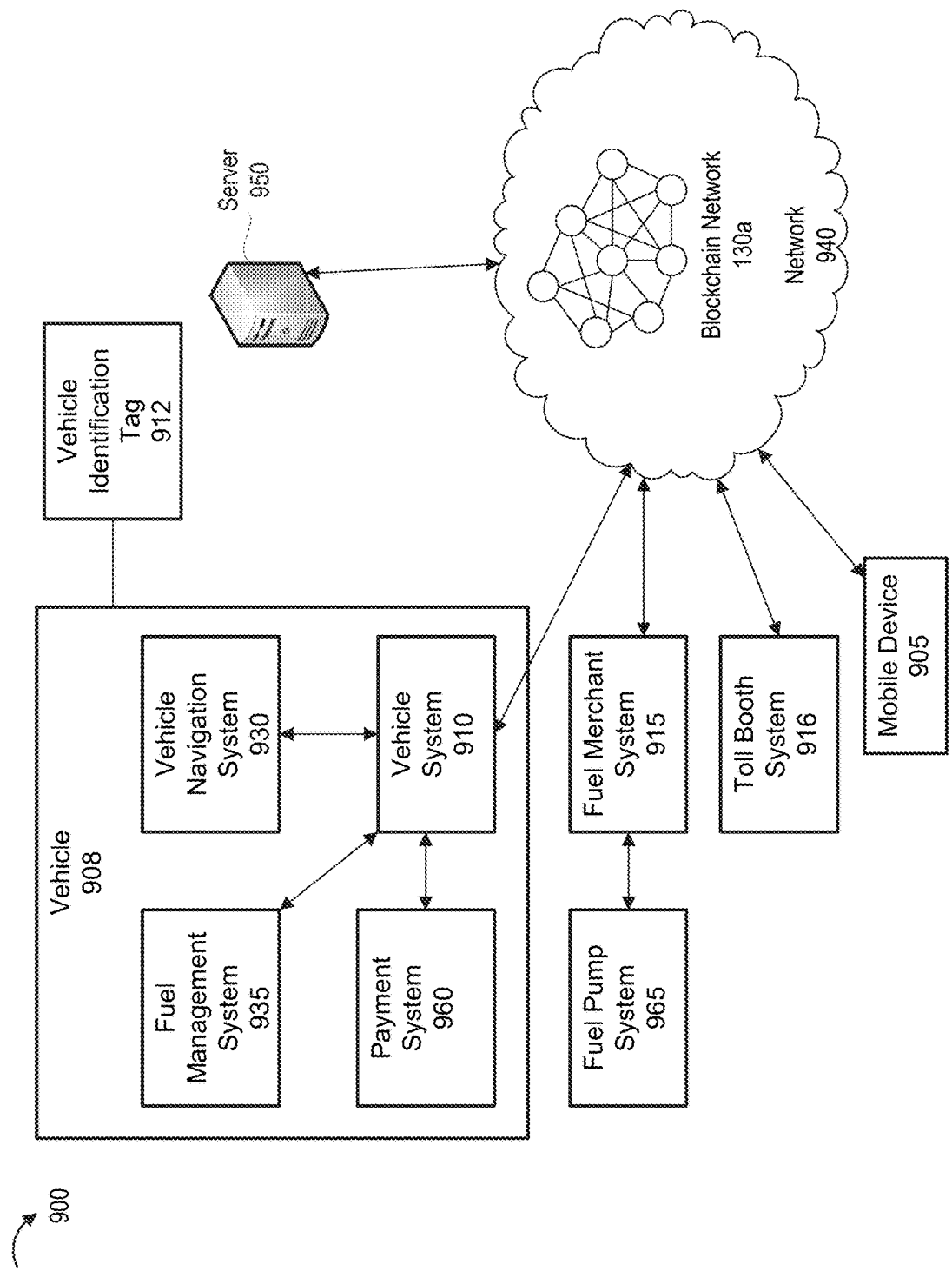
FIG. 9 illustrates an example of communications for an IoT blockchain enabled device system according to an embodiment of the present disclosure.

An example of blockchain enabled in-vehicle purchasing is described with reference to the system 900 shown in FIG. 9, the process 600 shown in FIG. 6A and the process 601 shown in FIG. 6B. FIG. 9 illustrates an example system 900 for blockchain enabled in-vehicle purchasing. The system 900 includes an IoT enabled smart vehicle 908. The vehicle 908 may include one or more computing devices implementing a vehicle system 910, a vehicle navigation system 930, a payment system 960 and a fuel management system 935. The vehicle 908 may include a RFID tag, such as a vehicle identification tag 912. The system 900 may also include various merchant systems, such as a fuel merchant system 915, and a toll booth system 916. The system 900 may also include a mobile device 905 belonging to a driver of the vehicle 908.

When the driver gets into the vehicle 908, payment information may be loaded from the driver's mobile device 905 into the vehicle payment system 910 so it is available for secure payments to other devices in order to complete in-vehicle purchases, such as in-vehicle purchase of fuel and in-vehicle payment of tolls. The driver of the smart vehicle may pay for parking, fast food, using the IoT enabled smart vehicle 908. Additionally, the IoT enabled smart vehicle 908 may also facilitate in-vehicle purchasing of smartphone apps, music, audio books, and other goods and services.

The fuel management system 935 may perform various functions related to fuel usage and communicate with the vehicle system 916. For example, the fuel management system 935 may monitor fuel usage and based on detecting that the fuel is below a threshold, notify the vehicle system 910. The vehicle system 910 may communicate with the vehicle navigation system 930 to determine nearby fuel stations. The selection of a fuel station to may be based on various factors, such as the availability of fuel at nearby fuel stations, the vehicle's current route and location, incentives that may be offered by nearby fuel stations, etc. The vehicle system 910 may notify the driver about the selection of a fuel station and the vehicle 908 may be re-routed to the selected fuel station. Upon arriving at the selected fuel station, the driver may pull up to a fuel pump. The fuel pump may include a fuel pump system 965 configured to detect the RFID tags of vehicles, such as the vehicle identification tag 912 in order to obtain an identification of the vehicles. The fuel pump system 965 and the payment system 960 may be configured to communicate with each other. The fuel payment system 960 may send payment information to the fuel pump system 965. After the driver has completed re-fueling, the driver may simply drive away. The fuel pump system 965 may send the fuel merchant system 915 information about the identification of the vehicle 908, the amount of fuel purchased, and the payment information. The fuel merchant system 915 may use the information to complete a transaction with the driver for the purchase of the fuel. For example, the fuel merchant system 915 may communicate with the server 950 to charge the driver for the fuel according to the process 600 shown in FIG. 6A. Additionally, the fuel merchant system 915 may communicate with the server 950 in order to create a smart contract between the driver and the fuel merchant. The smart contract may be created and executed according to the process 601 shown in FIG. 6B.

Augmented Reality (AR), Mixed Reality and Blockchain Based E-Commerce

AR or mixed reality enabled devices, such as wearable smart glasses, head mounted devices, holographic devices, or smartphone applications overlay digital content on top of a real world view, thus, enhancing a user's experience of the real world. The overlay content may be 3D models generated based on 3D scanning real world objects. AR enables users to experience online shopping in a virtual environment. For example, using AR, browse virtual stores and view 3D models of items for sale in virtual stores. Just as in the real world, customers may be able to handle and examine various physical details of the products. Blockchain smart contracts may be utilized to provide an e-commerce platform where customers may purchase items from online merchants with cryptocurrency and digital wallets. Information about a product, such as country of origin, materials, ingredients, price, description, measurements, terms and conditions, 3D model of the physical product, etc., may be hashed and recorded in a blockchain. This provides proof of ownership of virtual goods and products and enables accurate tracking of any changes made to this information. Artificial intelligence (AI) may be utilized for generating 3D models of products based on 2D images of the products. Smart contracts may be utilized to conduct transactions between merchants and customers.

As an example, a customer may shop for clothing by browsing different stores in a virtual shopping mall via a wearable AR device, such as a pair of smart glasses. The customer may examine a 3D model of a shirt as he or she would in the real world. Additionally, the customer may virtually try on the shirt using a 3D model of the customer's body. If the customer decides to purchase the shirt, the customer may initiate a transaction with the merchant of the store. A transaction may be submitted to the blockchain via the customer's digital wallet to transfer money (cryptocurrency) from the customer to the merchant. Various smart contracts may be utilized to implement various aspects of the e-commerce process. For example, based on detecting that the sale price of the shirt has been successfully transferred from the customer to the merchant, a smart contract may be executed to initiate shipment of the shirt from the merchant's warehouse to the customer. As described above with reference to supply chain monitoring and tracking, RFID tags and other IoT devices may be utilized to track the shipment of the shirt from the merchant's warehouse to the delivery of the shirt to the customer's residence.

Quantum Computing

One of the concerns of quantum computing is that it may increase the probability of breaking cryptographic algorithms and thus, weaken overall security for the blockchain. This may be addressed by requiring larger key sizes for some cryptographic algorithms or switching to quantum-proof algorithms. In some cases, if there is a concern that a block may be decrypted in the future, a dynamically changing cryptographic hash may be utilized. A different cryptographic hash may be dynamically selected for a particular block or the entire blockchain based on various factors, such as whether there is a concern that the block will be decrypted in the future, increasing a strength of the hash, utilizing a hash that is better suited for protecting privacy. In some cases, different cryptographic hashes may be selected for different blocks.

Anonymity and Privacy

As discussed above, the use of a private/public key pair to establish user authenticity during validation of a blockchain transaction provides some privacy as it does not reveal user identity. However, the transactions stored on a blockchain may be visible to the public. It has been shown that user identity may be derived from the publicly available transaction information.

Blockchain Size

Depending on a frequency at which events are recorded in a blockchain, the size of the blockchain may grow quickly. Computing/storage capacity (i.e., faster processors, larger storage components) may be needed to support the expansion of the blockchain. In some cases, blocks may be compressed prior to being added to the chain. In some cases, blocks may be eliminated, for example, at the beginning of the blockchain, when they become stale or irrelevant. As an example, a method for "replacing" the first 1000 transactions with a new block that effectively mimics the hash of the 1000 transactions may be useful for managing blockchain size.

Blockchain Immutability

In some cases, content in a blockchain may need to be deleted. For example, content may need to be deleted if there is a security breach or if the content is no longer relevant. A level of immutability of a blockchain may depend on a type of the blockchain. For example, changing content may be difficult in a public blockchain due to its possible impact on a large number of users. According to some techniques, data stored in a private blockchain, or a public blockchain controlled by a few entities may be changed by recording a flag (current block) where the change is being made, and adding the current block (referred to by the flag) to the blockchain. The added block may then indicate the change made to the previous block.

As another example, a blockchain may need to be changed to resolve a broken link. For example, the hash of a changed block may no longer match the hash stored in the block+1. In some cases, the blockchain may need to be changed in order to reverse the results of illegal transactions. In some cases, the blockchain may need to be changed to address software errors, erroneous transactions, or remove information that is confidential or required by law to be removed. If the blockchain is immutable, these errors and information may be permanently embedded in the blockchain. Additionally, the blockchain may need to be changed to comply with regulatory concerns, such as the European Union's incoming General Data Protection Regulation (GDPR), or California Consumer Privacy Act (CCPA), regarding consumer data privacy and ownership rights, US Fair Credit Reporting Act, and the SEC's "Regulation SP," which require that recorded user identifiable personal financial data be redactable.

Some techniques may allow modifications to the blockchain to address software errors, legal and regulatory requirements, etc., by allowing designated authorities to edit, rewrite or remove previous blocks of information without breaking the blockchain. Such techniques may enable blockchain editing by using a variation of a "chameleon" hash function, through the use of secure private keys. This editing may allow smart contracts that were flawed at issue to be updated so that the changes carry over to subsequent smart contracts in the blockchain. Using these techniques, blocks that have been changed may be using a "scar" or mark that cannot be removed, even by trusted parties.

According to some techniques, when a block is hashed, any confidential information, such as personally identifiable information, and IP addresses, is not included in the block because it is not part of the data values that were hashed. But because there is no hash of the confidential information, it may be changed. According to some techniques, the confidential information may not be placed or recorded into the blockchain. Rather the information may reside in a file that is external to the blockchain. A hash of that file, however, may be recorded in the blockchain. For example, a user's confidential information may be deleted locally without affecting the blockchain.

As another example, assuming that all content included in a block in a blockchain cannot be changed after a block is added to the blockchain, a determination may be made before adding data to the blockchain of whether some or all of that data may need to be deleted at a later time. For example, confidential information (i.e., data to be deleted at a later time) may be stored as a file that is external to the block and the blockchain. For the purposes of creating the block, a link to the file containing the confidential information and a hash of the file containing the confidential information file may be added to the block. An example of a link would be an HTTP link. During confirmation of the block that is to be added to the blockchain, the network nodes may be able to access the confidential information and verify that the confidential information based on the hash value of the file in the block. Because the hash value of the file is a part of the block, the file containing the confidential information may not be easily changed. However, it may be possible to change the confidential information file by changing the data therein and adding a nonce. This may seek to change the nonce until the resulting hash equals the hash that is stored in the blockchain. However, this would be difficult (probably near impossible), and an inspection of the modified confidential information file would reveal the added nonce, which may then raise suspicion that information was changed since it was first added to the blockchain.

Files containing confidential information may be encrypted (e.g., through an asymmetric key encryption function) prior to the hashing operation. When "deleting" the confidential information, the file containing the confidential information may be deleted or removed resulting in the link, which is stored in the blockchain, being ineffective for retrieving the file. The hash of the file, and the link, remain in the blockchain so that the linking of the blocks through hash functions is not affected. However, because of this change, a transaction that is part of the block or part of a different special block could be added to the blockchain to indicate that the link is no longer effective and the confidential information file is no longer part of the blockchain. This may effectively keep confidential information out of the blockchain while providing the confidential information to users of the blockchain and proof of authenticity of the confidential information before it is deleted from the blockchain. This may come with drawbacks because access to data implies that such data may be stored. Accordingly, those with access to the confidential information file, while it was part of the blockchain, may have stored that information in another location that may no longer be reachable during the "deleting" operation discussed above.

51% Attack

A "51% attack" refers to an individual mining node or a group of mining nodes controlling more than 50% of a blockchain network's mining power, also known as hash rate or hash power. The hash rate is a measure of the rate at which hashes are being computed on the blockchain network. As described above, hashing may include taking an input string of a given length, and running it through a cryptographic hash function in order to produce an output of a fixed length. A blockchain network's hash rate may be expressed in terms of 1 KHs (kilohash per second) which is 1,000 hashes per second, 1 MH/s (megahash per second) which is 1,000,000 hashes per second, 1 TH/s (terahash per second) which is 1,000,000,000,000 hashes per second, or 1 PH/s (petahash per second) which is 1,000,000,000,000,000 hashes per second. As an example, a mining node in a blockchain utilizing a proof of work consensus model (PoW) may perform hashing in order to find a solution to a difficult mathematical problem. The hash rate of the mining node may depend on the computational resources available to that node. A mining node that successfully solves the mathematical problem may be able to add a block to the blockchain. Thus, by ensuring that invalid transactions cannot be included in a block, mining nodes increase the reliability of the network. Transactions may be deemed invalid if they attempt to spend more money than is currently owned or engage in double spending. If a mining node intentionally or unintentionally includes an invalid transaction in a block, then the block will not be validated by the network. Additionally, nodes that accept the invalid block as valid and proceed to add blocks on top of the invalid block will also end up wasting computational resources. Thus, mining nodes are discouraged from cheating by intentionally adding invalid transactions to blocks and accepting invalid blocks as valid.

Figure 7A:
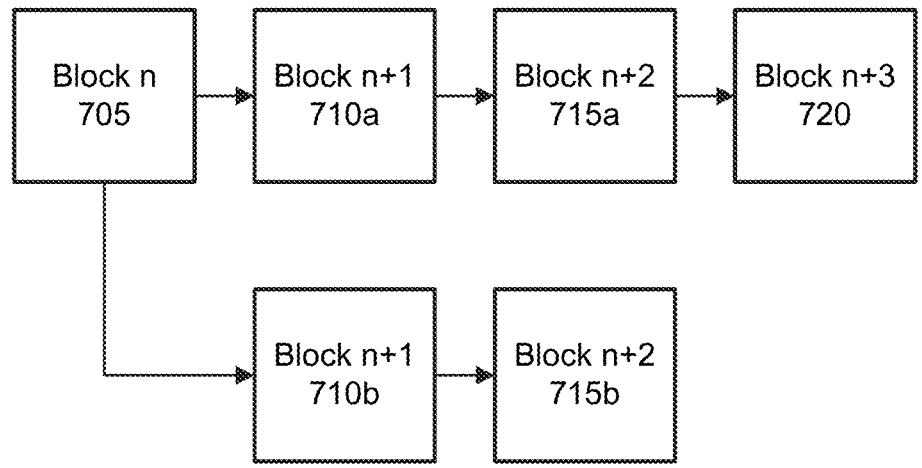
FIG. 7A shows an example of a privately broadcasted blockchain according to an embodiment of the present disclosure.
Figure 7B:
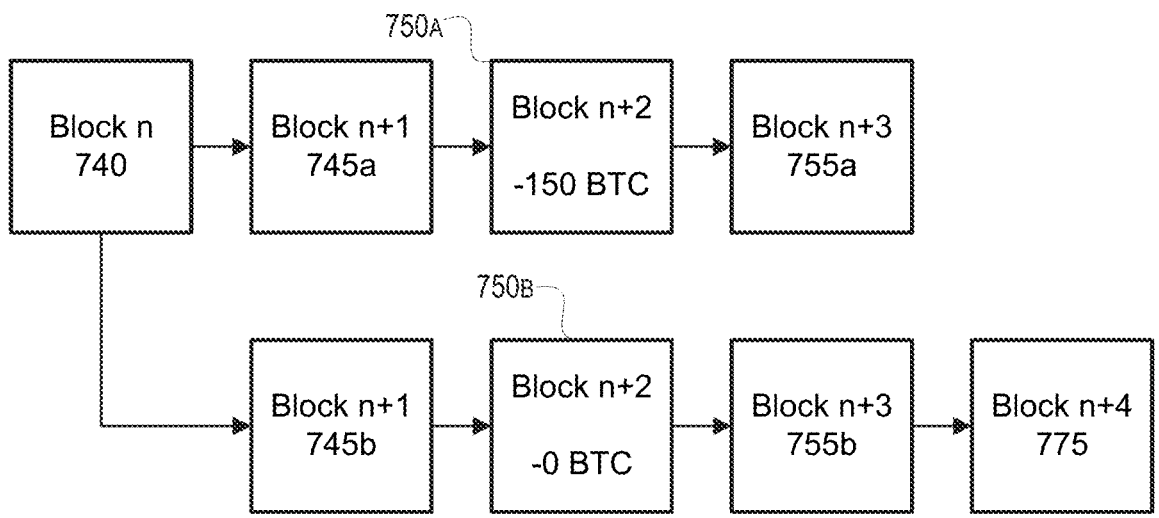
FIG. 7B shows an example of a blockchain misuse according to an embodiment of the present disclosure.

An entity may be able to disrupt the network by gaining control of 50% of a network's hash rate. In a 51% attack, a blockchain node may intentionally reverse or overwrite transactions and engage in double spending. When a node generates a valid block of transactions, it broadcasts the block to the network for validation. In some cases, a node controlling more than 50% of a network's hash rate may mine blocks in private without broadcasting them to the network. In such a scenario, the rest of the network may follow a public version of the blockchain while the controlling node may be following its private version of the blockchain. FIG. 7A shows a fraudulent and valid version of a blockchain 700. The valid blockchain on the top comprises the valid blocks 705, 710a, 715a, and 720. The fraudulent blockchain on the bottom is not broadcasted to the network and includes the blocks 705, 710b, 715b, and an invalid block 720, FIG. 7B shows another fraudulent and valid version of a blockchain. The valid version of the blockchain includes nodes 740, 745a, 750a, and 755a, The fraudulent version of the blockchain includes nodes 740, 745b, 750b, 755b, and 775. However, following the longest chain rule, the network may select and utilize the private or fraudulent blockchain comprising nodes 740, 745b, 750b, 755b and 775. Since it is the longest chain, previous transactions may be updated according to this chain. The cheating node may include transactions that spend money, such as the block 750b including the transaction for 150 BTC, on the public or fraudulent version of the blockchain without including these transactions in the private version of the blockchain. Thus, in the private version of the blockchain, the cheating node may continue to own the spent 150 BTC. When the cheating node controls more than 50% of the hashing resources of the network, it may be able to broadcast its private version of the blockchain and continue to create blocks on the private blockchain faster than the rest of the network, thus, resulting in a longer blockchain. Since there are two versions of the blockchain, the network may select the longest or fraudulent private blockchain as the valid blockchain. As a result, the rest of the network may be forced to use the longer blockchain. The public or valid version of the blockchain may then be discarded or abandoned and all transactions in this blockchain that are not also in the private or fraudulent version of the blockchain may be reversed. The controlling or cheating node may continue to own the spent money because the spending transactions are not included on the fraudulent version of the blockchain, and the cheating node may, therefore, spend that money in future transactions.

Because of the financial resources needed to obtain more hashing power than the rest of the entire network combined, a successful 51% attack may generally be challenging to achieve. However, it would be less expensive to achieve a 51% attack on a network with a lower hash rate than one with a higher hash rate. Additionally, the probability of a successful 51% attack increases with the use of mining pools in which multiple nodes may combine their computational resources, for example, when mining is performed from the same mining pool.

Computing Device

Figure 10:
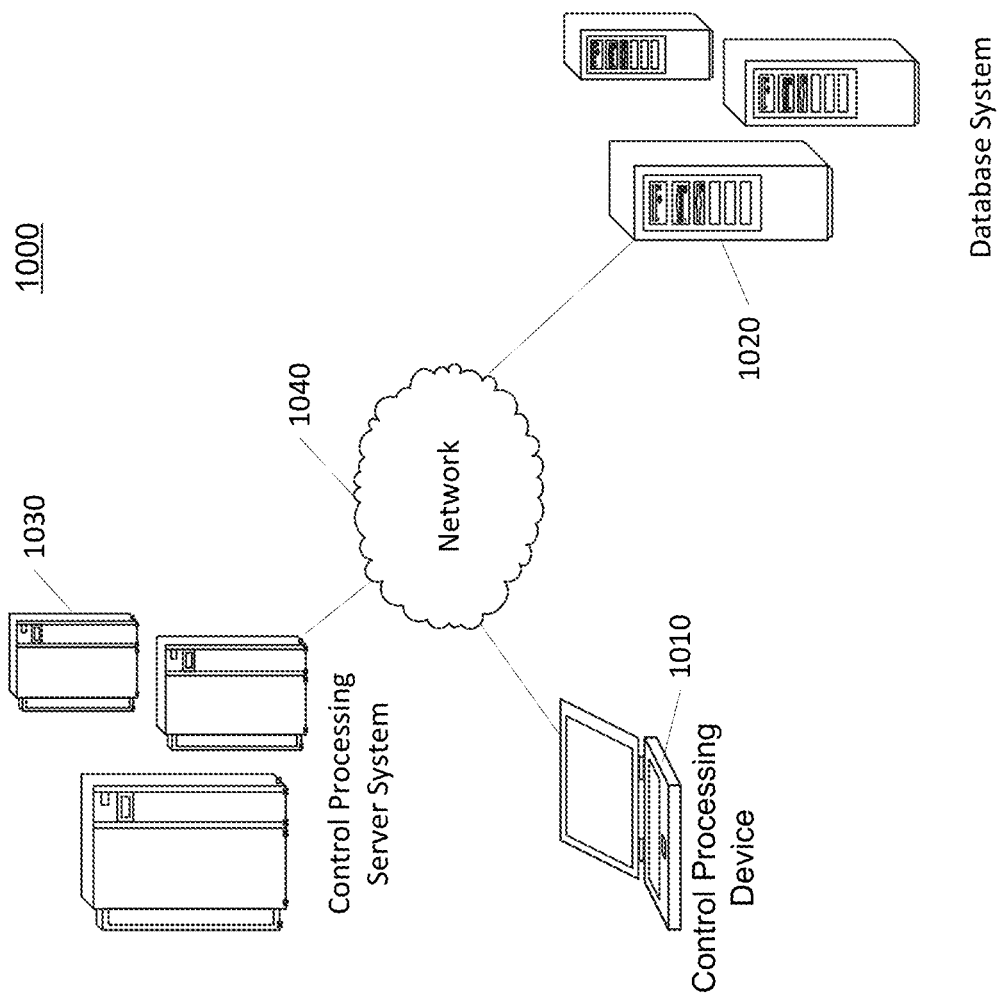
FIG. 10 illustrates an example system according to an embodiment of the present disclosure.

FIG. 10 shows a system 1000. The system 1000 may include at least one client device 1010 (also referred to as "control processing device"), at least one database system 1020, and/or at least one server system 1030 in communication via a network 1040. It will be appreciated that the network connections shown are illustrative and any means of establishing a communications link between the computers may be used. The existence of any of various network protocols such as TCP/IP, Ethernet, FTP, HTTP and the like, and of various wireless communication technologies such as GSM, CDMA, WiFi, and LTE, is presumed, and the various computing devices described herein may be configured to communicate using any of these network protocols or technologies. Any of the devices and systems described herein may be implemented, in whole or in part, using one or more computing systems described with respect to FIG. 10.

Client device 1010 may access server applications and/or resources using one or more client applications (not shown) as described herein. Client device 1010 may be a mobile device, such as a laptop, smart phone, mobile phones, or tablet, or computing devices, such as a desktop computer or a server, wearables, embedded devices. Alternatively, client device 1010 may include other types of devices, such as game consoles, camera/video recorders, video players (e.g., incorporating DVD, Blu-ray, Red Laser, Optical, and/or streaming technologies), smart TVs, and other network-connected appliances, as applicable.

Database system 1020 may be configured to maintain, store, retrieve, and update information for server system 1030. Further, database system 1020 may provide server system 1030 with information periodically or upon request. In this regard, database system 1020 may be a distributed database capable of storing, maintaining, and updating large volumes of data across clusters of nodes. Database system 1020 may provide a variety of databases including, but not limited to, relational databases, hierarchical databases, distributed databases, in-memory databases, flat file databases, XML databases, NoSQL databases, graph databases, and/or a combination thereof.

Server system 1030 may be configured with a server application (not shown) that is capable of interfacing with client application and database system 1020 as described herein. In this regard, server system 1030 may be a stand-alone server, a corporate server, or a server located in a server farm or cloud-computer environment. According to some examples, server system 1030 may be a virtual server hosted on hardware capable of supporting a plurality of virtual servers.

Network 1040 may include any type of network. For example, network 1040 may include a local area network (LAN), a wide area network (WAN), a wireless telecommunications network, and/or any other communication network or combination thereof. It will be appreciated that the network connections shown are illustrative and any means of establishing a communications link between the computers may be used. The existence of any of various network protocols such as TCP/IP, Ethernet, FTP, HTTP and the like, and of various wireless communication technologies such as GSM, CDMA, WiFi, and LTE, is presumed, and the various computing devices described herein may be configured to communicate using any of these network protocols or technologies.

The data transferred to and from various computing devices in a system 1000 may include secure and sensitive data, such as confidential documents, customer personally identifiable information, and account data. Therefore, it may be desirable to protect transmissions of such data using secure network protocols and encryption, and/or to protect the integrity of the data when stored on the various computing devices. For example, a file-based integration scheme or a service-based integration scheme may be utilized for transmitting data between the various computing devices. Data may be transmitted using various network communication protocols. Secure data transmission protocols and/or encryption may be used in file transfers to protect the integrity of the data, for example, File Transfer Protocol (FTP), Secure File Transfer Protocol (SFTP), and/or Pretty Good Privacy (PGP) encryption. In many embodiments, one or more web services may be implemented within the various computing devices. Web services may be accessed by authorized external devices and users to support input, extraction, and manipulation of data between the various computing devices in the system 1000. Web services built to support a personalized display system may be cross-domain and/or cross-platform, and may be built for enterprise use. Data may be transmitted using the Secure Sockets Layer (SSL) or Transport Layer Security (TLS) protocol to provide secure connections between the computing devices. Web services may be implemented using the WS-Security standard, providing for secure SOAP messages using XML encryption. Specialized hardware may be used to provide secure web services. For example, secure network appliances may include built-in features such as hardware-accelerated SSL and HTTPS, WS-Security, and/or firewalls. Such specialized hardware may be installed and configured in the system 1000 in front of one or more computing devices such that any external devices may communicate directly with the specialized hardware.

Figure 11:
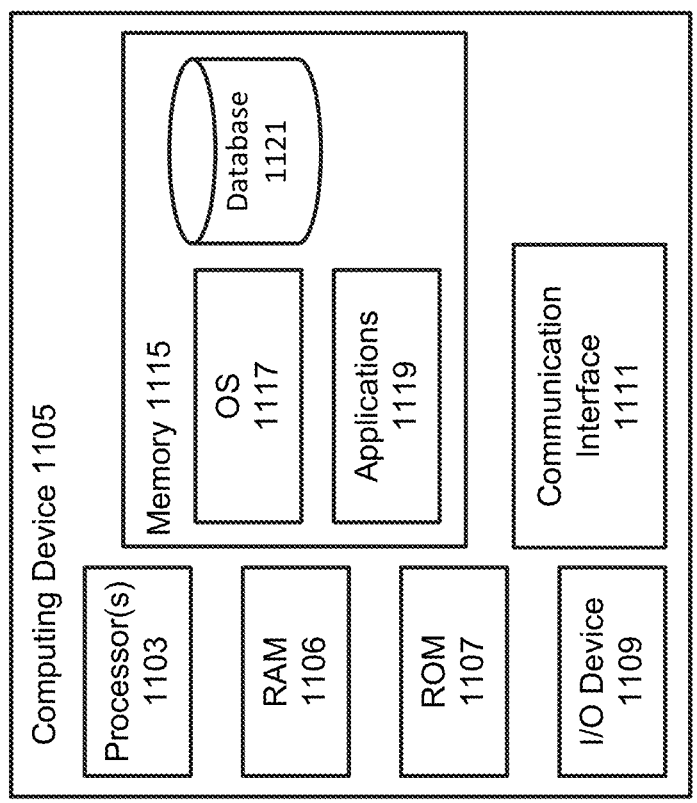
FIG. 11 illustrates an example computing device according to an embodiment of the present disclosure.

Turning now to FIG. 11, a computing device 1105 that may be used with one or more of the computational systems is described. The computing device 1105 may include a processor 1103 for controlling overall operation of the computing device 1105 and its associated components, including RAM 1105, ROM 1107, input/output device 11011, communication interface 1111, and/or memory 1115. A data bus may interconnect processor(s) 1103, RAM 1106, ROM 1107, memory 1115, I/O device 1109, and/or communication interface 1111. In some embodiments, computing device 1105 may represent, be incorporated in, and/or include various devices such as a desktop computer, a computer server, a mobile device, such as a laptop computer, a tablet computer, a smart phone, any other types of mobile computing devices, and the like, and/or any other type of data processing device.

Input/output (I/O) device 1109 may include a microphone, keypad, touch screen, and/or stylus motion, gesture, through which a user of the computing device 1105 may provide input, and may also include one or more of a speaker for providing audio output and a video display device for providing textual, audiovisual, and/or graphical output. Software may be stored within memory 1115 to provide instructions to processor 1103 allowing computing device 1105 to perform various actions. For example, memory 1115 may store software used by the computing device 1105, such as an operating system 1117, application programs 1119, and/or an associated internal database 1121. The various hardware memory units in memory 1115 may include volatile and nonvolatile, removable and non-removable media implemented in any method or technology for storage of information such as computer-readable instructions, data structures, program modules, or other data. Memory 1115 may include one or more physical persistent memory devices and/or one or more non-persistent memory devices. Memory 1115 may include, but is not limited to, random access memory (RAM) 1106, read only memory (ROM) 1107, electronically erasable programmable read only memory (EEPROM), flash memory or other memory technology, optical disk storage, magnetic cassettes, magnetic tape, magnetic disk storage or other magnetic storage devices, or any other medium that may be used to store the desired information and that may be accessed by processor 1103.

Communication interface 1111 may include one or more transceivers, digital signal processors, and/or additional circuitry and software for communicating via any network, wired or wireless, using any protocol as described herein.

Processor 1103 may include a single central processing unit (CPU), which may be a single-core or multi-core processor, or may include multiple CPUs. Processor(s) 1103 and associated components may allow the computing device 1100 to execute a series of computer-readable instructions to perform some or all of the processes described herein. Although not shown in FIG. 11, various elements within memory 1115 or other components in computing device 1105, may include one or more caches, for example, CPU caches used by the processor 1103, page caches used by the operating system 1117, disk caches of a hard drive, and/or database caches used to cache content from database 1121. For embodiments including a CPU cache, the CPU cache may be used by one or more processors 1103 to reduce memory latency and access time. A processor 1103 may retrieve data from or write data to the CPU cache rather than reading/writing to memory 1115, which may improve the speed of these operations. In some examples, a database cache may be created in which certain data from a database 1121 is cached in a separate smaller database in a memory separate from the database, such as in RAM 1106 or on a separate computing device. For instance, in a multi-tiered application, a database cache on an application server may reduce data retrieval and data manipulation time by not needing to communicate over a network with a back-end database server. These types of caches and others may be included in various embodiments, and may provide potential advantages in certain implementations of devices, systems, and methods described herein, such as faster response times and less dependence on network conditions when transmitting and receiving data.

Although various components of computing device 1105 are described separately, functionality of the various components may be combined and/or performed by a single component and/or multiple computing devices in communication without departing from the invention.

DESCRIPTION OF THE INVENTION

Cryptocurrencies are often used to launder money that has been obtained through illegal or unfair practices. Most trade activities in the Dark Web are conducted using cryptocurrencies such as Bitcoin and Zcash. After receiving funds in cryptocurrency, users will try to evade detection by transferring funds into multiple other accounts. This technique is called coin mixing or layering, and its aim is to obfuscate the money trail in the blockchain. However, a key caveat of coin mixing is that it is always observable on the blockchain. Whenever funds are moved, a transaction is recorded in the blockchain. As such, all transactions associated with a malicious account can be grouped using clustering heuristics, and clusters can be naively attributed to the user. If at any point, the user tries to cash out using any notable exchange such as Coinbase™, the user's identity is exposed which allows the law enforcement agencies to apprehend the user. Currently, useful tools such as Chainalysis™ are available, which can help law enforcement agencies to monitor, cluster, and annotate accounts that engage in money laundering activities. It is reasonable to assume that the ability to track funds in the blockchain acts a deterrent against money laundering since users cannot evade detection despite sophisticated coin mixing.

To perform the analysis in the aforementioned scenario, such as by using Chainalysis™, the following assumptions are often made: (1) All cryptocurrency transfers are eventually recorded in the blockchain. Therefore, no matter how a user shifts funds through coin mixing, each mix is recorded in the blockchain transaction. (2) Even if funds change hands (e.g., User A sends cryptocurrency to User B), law enforcement agencies can reverse-track the flow of funds. The second assumption is intuitively plausible since User A must know User B prior to sending User B money. When User B cashes out at a cryptocurrency exchange platform and is apprehended, law enforcement agencies can track User A through User B. With these assumptions in place, it can be argued that money laundering through cryptocurrencies is trackable despite complexities.

However, the present disclosure will rebut the two aforementioned assumptions and show that sophisticated money laundering is possible in the cryptocurrency ecosystem. First, the discussion below will show that not all cryptocurrency transactions are recorded on the blockchain. Second, the discussion below will show that the exchange between two parties can take place without the parties knowing anything about each other except their public keys. Based on this knowledge, bad actors are able to launder money and completely evade detection by anti-money laundering (AML) tools such as Chainalysis™. Finally, a solution for detecting money laundering, despite the unavailability of a blockchain footprint, is proposed.

Figure 12A:
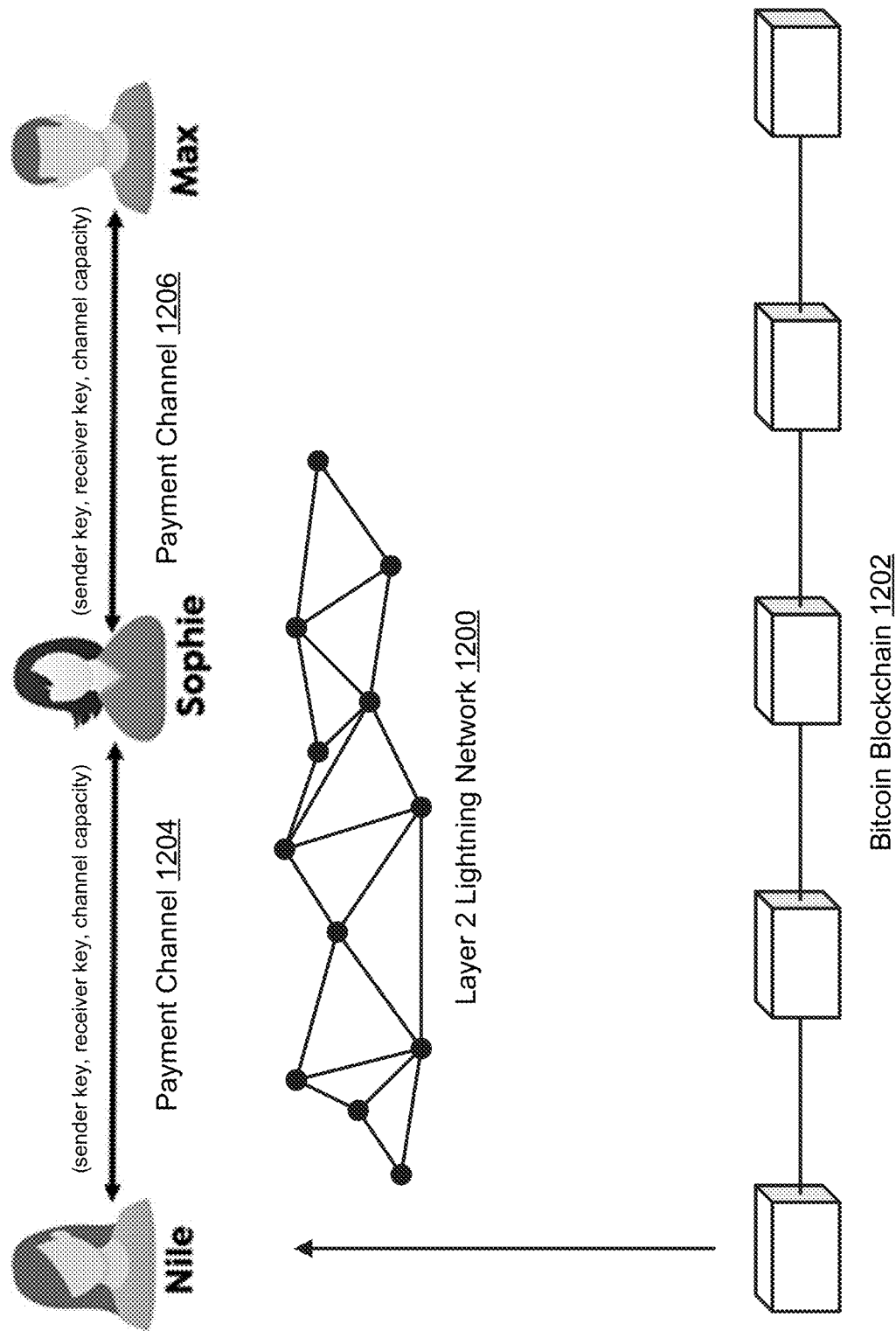
FIG. 12A illustrates a second layer network protocol configured to allow bi-directional payment channels between users to conduct transactions external to a first layer blockchain according to an embodiment of the present disclosure.

Referring to FIG. 12A, illustrated is a second layer Lightning Network 1200 configured to allow bi-directional payment channels between users, which enables the users to conduct transactions external to (e.g., off) the Bitcoin blockchain 1202, rather than on the Bitcoin blockchain 1202 as would typically occur for blockchain transactions. A payment channel (e.g., payment channels 1204 and 1206) is a specialized form of state channel. In a state channel, a portion of the blockchain 1202 is sealed off via a multi-signature or smart contract, which is pre-agreed upon by the participants of the state channel. A state channel that deals only in payments is called a payment channel. In a payment channel, the participants can directly interact with each other without submitting anything to miners for the blockchain 1202 (e.g., for validation and recordation to a block in the blockchain 1202). The participants may engage in multiple microtransactions with each other within a payment channel capacity. A payment channel capacity may be the total balance available within the payment channel, where the ability of either participant to send or receive cryptocurrency is defined by the balance on either side of the bi-directional payment channel. When a payment channel is closed, the final transaction set is added to the blockchain 1202 (e.g., a final balance representing all the microtransactions that occurred off the blockchain 1202 in the Lightning Network 1200 via the opened payment channel). A payment channel may be closed at a time that is predetermined by the participants or earlier if decided by at least one participant. In some cases, a payment channel may be closed when certain conditions are met, such as a certain amount of time has lapsed or a certain number of transactions have been processed in the payment channel.

The following are different examples of payment channels: Nakamoto High-Frequency Transactions, Spillman-Style Payment Channel, CLTV-Style Payment Channels, Hashed Timelock Contracts (HTLC). When using HTLC, a user may open up payment channels such that funds can be transferred between parties before a pre-agreed deadline. The payments may be acknowledged between the participants via a submission of a cryptographic proof, as further described herein.

An illustration of two payment channels, 1204 and 1206, which have been established in the Lightning Network 1200, is shown in FIG. 12A. Consider an example case where Nile would like to send 10 bitcoins to Max. Nile may have 10 bitcoins in her Bitcoin address that is publicly observable in the blockchain 1202. Nile may open the payment channel 1204 with another user, Sophie, in the Lightening Network 1200. The payment channel 1204 consists of the sender's public key (corresponding to Nile), the receiver's public key (corresponding to Sophie), the channel capacity (maximum amount that can be sent), and an HTLC contract specification (not shown in FIG. 12A).

Similarly, Sophie may establish the payment channel 1206 with Max using similar conditions. The payment channels 1204 and 1206 may have been established at the same time or at different times. Now, there are two channels 1204 and 1206 in the network where Nile is connected to Sophie, and Sophie is connected to Max. The payment channels 1204 and 1206 may be two of a plurality of payment channels that exist in the Lightning Network 1200 amongst nodes.

Figure 12B:
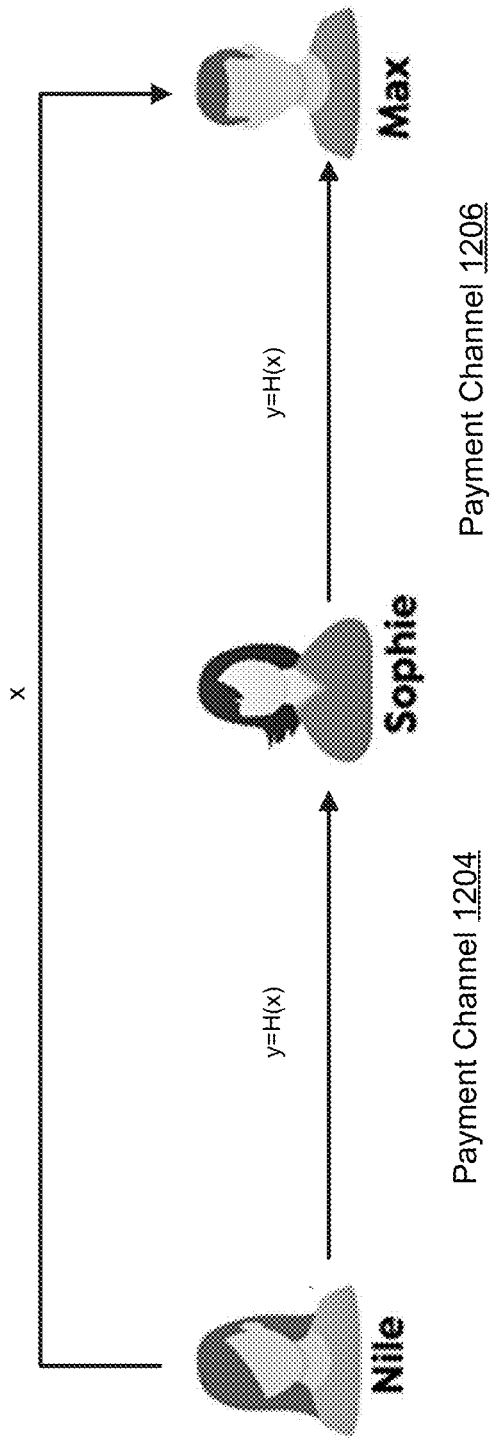
FIG. 12B illustrates an example payment path in a second layer network according to an embodiment of the present disclosure.

Nile may probe the network topology of the Lightning Network 1200 and learn that Sophie is connected to Max via the payment channel 1206. Thus, Nile may determine that she may send 10 bitcoins to Max through Sophie as Nile and Sophie are connected via the payment channel 1204. To send the bitcoins to Max from Nile, the following operations may be executed in the Lightning Network 1200, as illustrated in FIG. 12B.

(1) Nile generates a payment of 10 bitcoins to Sophie on the payment channel 1204 and adds a condition in an HTLC lock where the condition is $y=H(x)$. Here, $x$ may be a random number and $y$ may be the hash of that random number. In order to receive the payment of 10 bitcoins, Sophie must know the value of $x$. However, Nile does not tell Sophie the value of $x$ and the value of $x$ would be computationally very difficult to solve for by Sophie.

(2) Sophie repeats the process above (1) with Max. That is, Sophie sets up a payment of 10 bitcoins on the payment channel 1206 with Max with a condition $y=H(x)$, where $x$ must be provided by Max to receive the payment from Sophie. At this point, Sophie does not know the value of $x$, which is only known to Nile.

(3) Nile then sends the random value $x$ to Max, for example, through a messenger application, such as WhatsApp (or email, text message, etc.). With the value of $x$, which was given to Max by Nile, Max can compute $y=H(x)$ and pull funds from Sophie on the payment channel 1206. By pulling funds, Max invariably discloses $x$ to Sophie. Now with the value of $x$ from Max, Sophie may then compute $y=H(x)$ and pull funds from Nile on the payment channel 1204.

As a result, Nile ends up sending 10 bitcoins to Max through Sophie. Nile could have also split her payments into 1 bitcoin and sent 10 payments to Max. The payments on the Lightning Network 1200 that are effectively made to Max from Nile (through Sophie) would not be visible on the blockchain 1202. Once all the channel balances are settled, one final close channel transaction can be generated on the blockchain 1202 showing that Nile's public key (or address) transferred 10 bitcoins to Sophie's public key, and Sophie's public key transferred 10 bitcoins to Max's public key.

From the above example, it may seem that the transfer of funds from Nile to Max can be tracked on the blockchain 1200 by observing the close-channel transactions. However, in practice, with multiple hops in the payment path in the Lightning Network 1200 with varying channel capacities and timeouts, the close-channel transactions cannot be easily used to track the payment from Nile to Max. Moreover, unlike the first layer blockchain (the blockchain 1202) where two users must know each other prior to conducting a transaction, in the second layer (the Lightning Network 1200), there is no such requirement. That is, Nile can set up a channel with Sophie with only knowledge of Sophie's public key. The cryptographic primitives of the Lightning Network 1200 allow the eventual distribution of funds without the parties knowing any real-world identifying information of each other. For instance, if Nile had funneled money from the Dark Web, which ended up being routed to Sophie in the Lightening Network 1200, Sophie has no way to know who Nile is. If Sophie cashes out at a cryptocurrency exchange platform and law enforcement is able to track her down, she will not be able to give any meaningful information about Nile.

Figure 13:
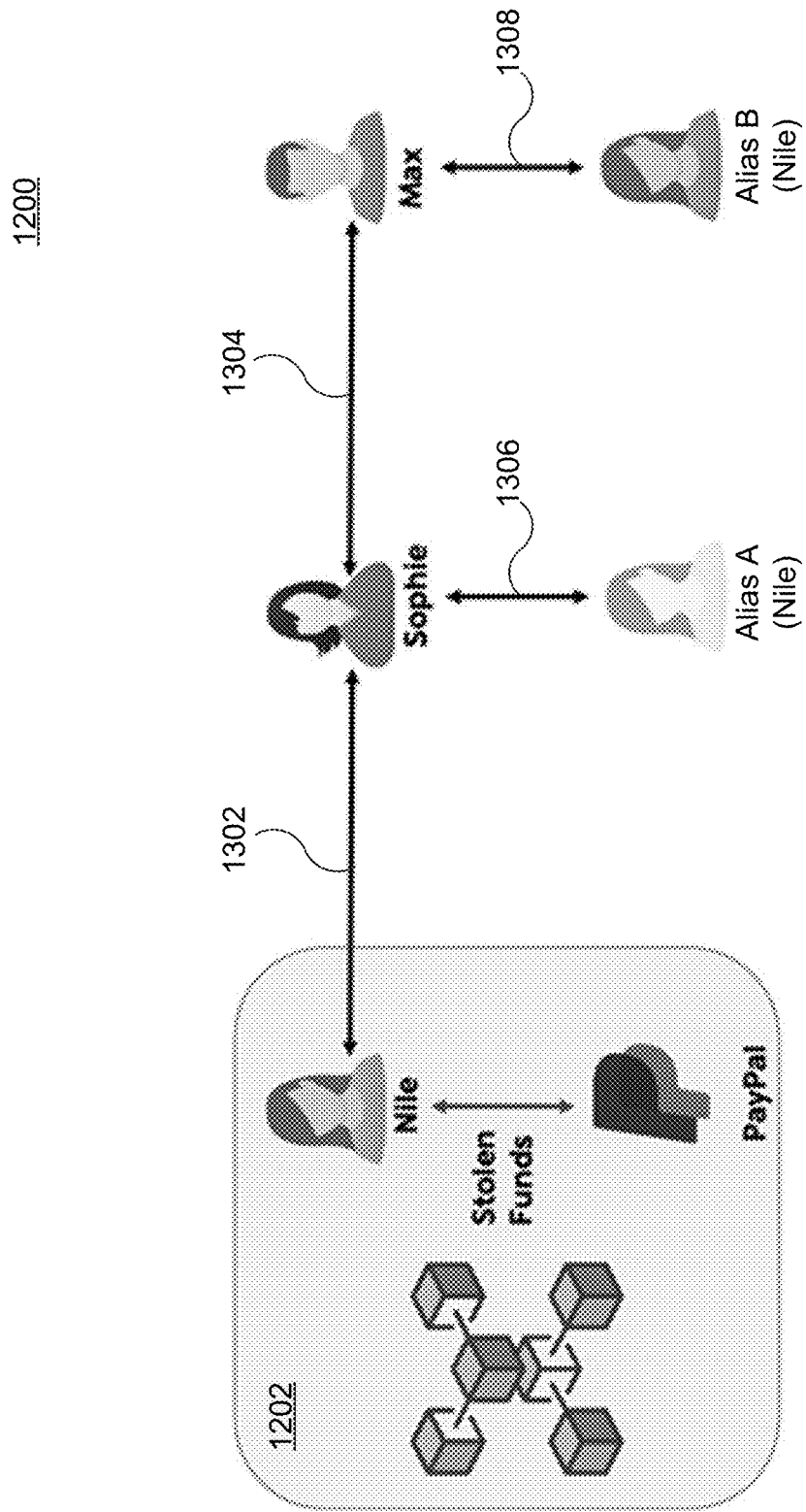
FIG. 13 illustrates an example construction by which a user can launder money in a second layer network.

For illustrative purposes only, FIG. 13 shows an attack construction by which a malicious Nile can launder money in the Lightning Network 1200. For the attack, it is assumed that Nile stole 10 bitcoins from PayPal's hot wallet and the stolen funds are noticed by PayPal and attributed by Chainalysis™ or other AML tool to Nile's account. However, Nile has established a payment channel 1302 with Sophie and also has two other aliases (Alias A and Alias B) in the Lightning Network 1200 connected to both Sophie and Max via payment channels 1306 and 1308, respectively. After stealing funds from PayPal, instead of mixing them on the blockchain 1202 (which would be detected by Chainalysis™), Nile routes the stolen funds to her aliases in the Lightning Network 1200 through Sophie and Max. For instance, Nile may send 1 bitcoin to her Alias A through Sophie and then close the channel 1306. Nile may then send 9 bitcoins to her Alias B by routing them through Sophie and Max (e.g., via channels 1302, 1304, and 1308). Once channels 1302-1308 are closed, the only events observable on the blockchain 1202 will be that (1) Nile sent 10 bitcoins to Sophie's account, and (2) four channels were closed including three channels established by Sophie. However, the only usable information for a law enforcement agency would be that Nile sent 10 bitcoins to Sophie, which can be concluded using Chainalysis™. If Sophie ever tries to cash out, she may be investigated. However, since Sophie does not know anything about Nile, law enforcement agencies would not be able to trace back to Nile, who has already moved funds to her aliases. In other words, since the flow of funds is not observable on the first layer blockchain (blockchain 1202), Chainalysis™ and other conventional AML tools will not be able to track or attribute the funds. This is one demonstrative example of a sophisticated money laundering technique that uses a second layer network (e.g., the Lightning Network 1200, Layer-2) and is not detectable by conventional compliance tools such as those provided by Chainalysis™ and TRM Labs™.

The present disclosure proposes systems and methods that provide visibility into transactions conducted in the second layer network (the Lightning Network 1200). In one embodiment, a plurality of nodes are operated in the Lightning Network 1200 and channels are established between the operated nodes and all other nodes in the Lightning Network 1200. For example, if there are approximately 10,000 nodes in the Lightning Network 1200, then 10,000 public keys may be generated for an operated lightning node and a channel may be established with all the other nodes in Lightning Network 1200. By establishing direct channels to each node in the Lightning Network 1200, an operated lightning node provides a one-hop reach to each other node in the Lightning Network 1200. In some embodiments, the Lightning Network 1200 topology may be periodically/continuously queried in order to discover, learn, and monitor new nodes, new channels, and channel capacities. Monitoring the channel capacities may assist in tracking the flow of funds in the Lightning Network 1200 as well as tracing funds between the second layer Lightning Network 1200 and the first layer blockchain 1202.

Figure 14:
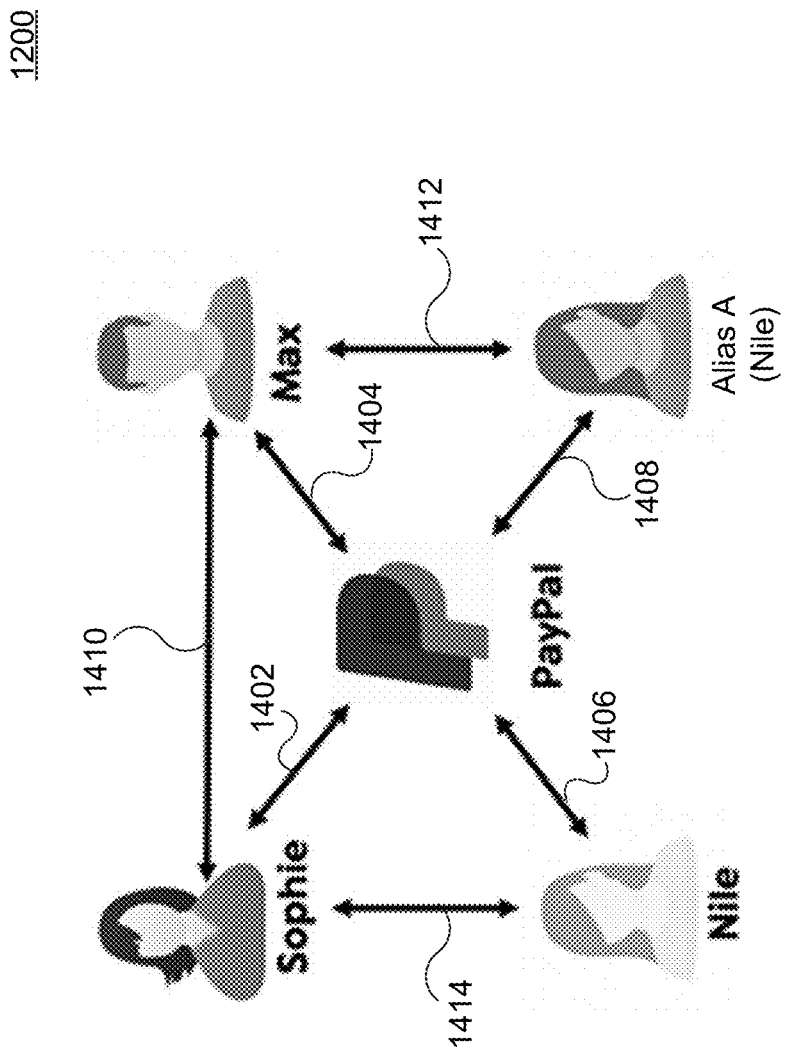
FIG. 14 illustrates an example node position for an entity in a second layer network according to an embodiment of the present disclosure.

FIG. 14 illustrates an example in which an entity, such as PayPal, has a node position in the Lightening Network 1200 according to one or more embodiments of the present disclosure. PayPal has established payment channels 1402-1408 between each of the nodes in the Lightning Network 1200 (e.g., Nile, Sophie, Max, and Nile's alias, Alias A). A payment channel 1414 may have been established between Nile and Sophie. A payment channel 1410 may have been established between Sophie and Max. A payment channel 1412 may have been established between Max and Alias A.

In the example shown in FIG. 14, consider a scenario in which Nile is being investigated in the second layer Lightning Network 1200 for money laundering. If Sophie wants to send 1 bitcoin, originating from Nile, to Nile's alias, Alias A, Sophie can either send it through Max or through PayPal. If the payment is routed through PayPal, then PayPal will know (1) Nile through the first layer blockchain 1202, (2) Sophie through the payment channel 1402, and (3) Nile's alias, Alias A, through the payment channel 1408.

However, if the payment is not routed through PayPal but rather through Sophie and Max, PayPal can constantly (e.g., periodically) query the channel capacity of each channel in the Lightning Network 1200 and use the change in the channel capacities over time to learn (1) how many coins (e.g., how much cryptocurrency) Nile sent to Sophie, (2) how many coins Sophie sent to Max, and (3) how many coins Max sent to Nile's alias. By combining all these insights, PayPal can learn the movement of funds and the public addresses of Nile and Nile's aliases.

Thus, two scenarios are constructed above: a first in which PayPal moves funds from Nile to Nile's aliases, and a second, in which PayPal does not participate in the movement of funds. The two scenarios can be made possible by dynamically adjusting a payment channel fee (e.g., processing incentive amount). If PayPal offers a lower fee than any other channel for a payment path, PayPal will be selected by all nodes in the Lightning Network 1200 to route their payments, which will provide PayPal with complete visibility of the payment path.

For example, the second scenario may be created by setting the payment fee at a high value which would force each node in the Lightning Network 1200 to find alternative payment routes to an end recipient. In this approach, although, PayPal will not be routing payments and receiving a routing fee, PayPal will still be able to monitor the movements of funds by querying the channel capacities in the Lightning Network 1200 and keeping track of the movement of funds based on the varying capacities over time. The value needed to discourage nodes from using PayPal's Lightning Network 1200 node(s) may be determined based on current processing fees that other nodes in the Lightning Network 1200 are requesting. For example, PayPal may select a value that is greater than all of the other current processing fees in the Lightning Network 1200.

Figure 15:
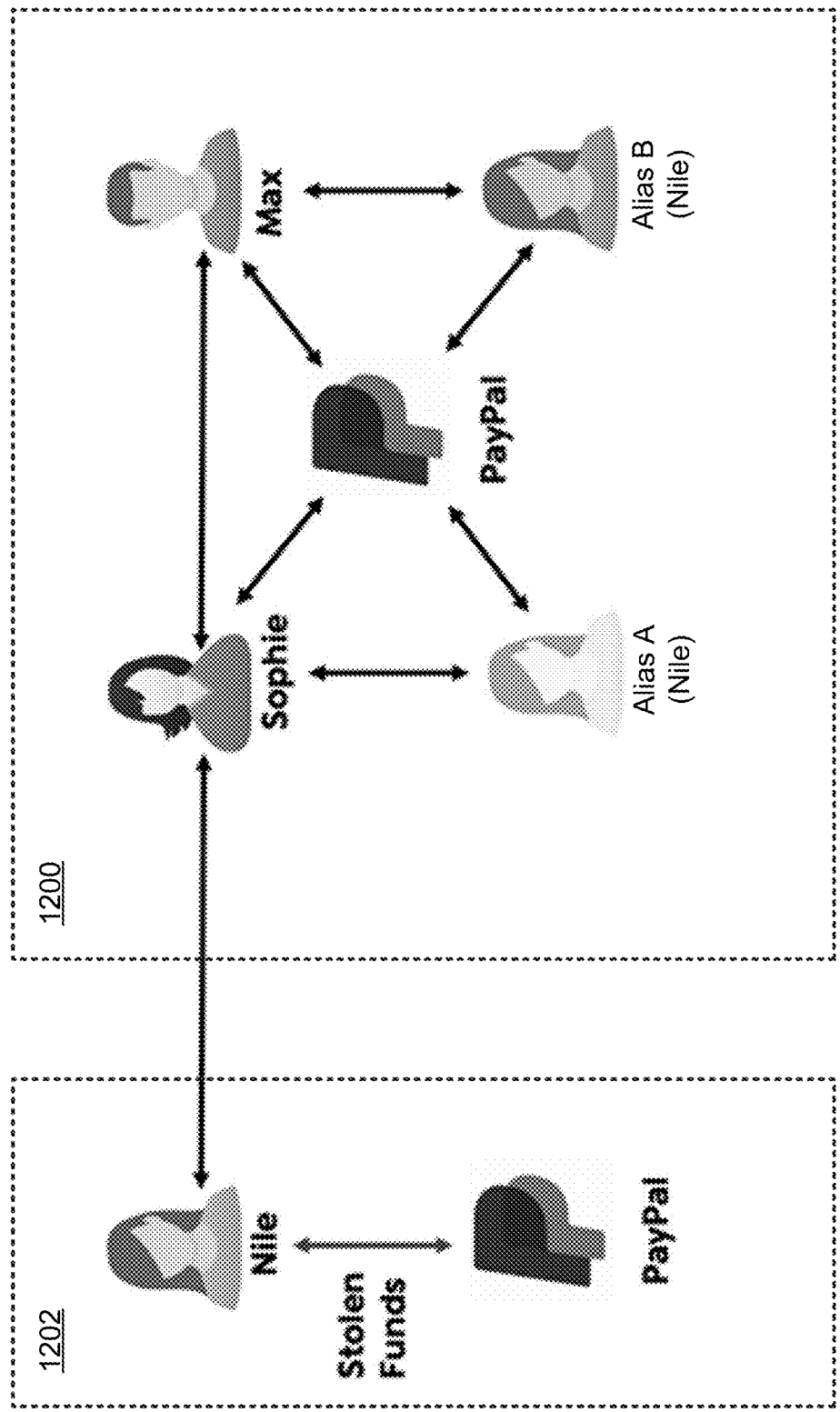
FIG. 15 illustrates an example use case of a framework according to an embodiment of the present disclosure.

FIG. 15 illustrates an example use case of a proposed framework of the present disclosure. Suppose Nile steals money from PayPal's hot wallet in the first layer blockchain 1202 and attempts to perform money laundering by transferring the funds to her aliases, Alias A and B, using the second layer Lightning Network 1200. Once the theft has occurred on the first layer blockchain 1202, PayPal will know the public/account address of Nile and will quickly establish channels with Nile and its neighbors in the Lightning Network 1200. Nile's neighbors may include the neighboring nodes to which Nile has established a second layer channel. Knowledge of Nile's neighboring nodes (and other nodes which are connected in the Lightning Network 1200) may be publicly accessible and may be obtained, for example, by sending a routing probe in the Lightning Network 1200.

According to various embodiments, PayPal may transition between the two approaches previously discussed, that is, a low-routing-fee approach that encourages all nodes in the Lightning Network 1200 to use PayPal's lightning node as a one-hop payment route to an end recipient, and a high-routing-fee approach whereby PayPal can monitor channel capacities to observe all of the payment transactions that occur across payment channels in the Lightning Network 1200 and deduce the movement of funds. Both approaches may allow PayPal to learn the public keys of Nile's aliases. PayPal may then track Nile's alias addresses in the first layer blockchain 1202 manually or with the assistance of tools such as Chainalysis™. When Nile attempts to cash out using her aliases, Nile's real-world identity can be determined. For example, when Nile attempts to cash out on a cryptocurrency exchange, such as Binance™, Coinbase™, or other exchanges with "know your client" (KYC)/identity verification in place, PayPal may contact the exchange to request details of the seller (Nile in the above illustrative case).

Therefore, the disclosed framework provides a way to monitor money laundering activities that occur in the second layer Lightning Network 1200, which was previously undetectable using prior systems and methods. Further, the disclosed framework allows an entity to automatically develop channels in the second layer after a theft and gain visibility into the second layer activities related to the theft. By using low-fee or high-fee payment channels in the second layer Lightning Network 1200, entities may directly or indirectly monitor the flow of funds outside of the first layer blockchain 1202. Additionally, the network topology in the second layer Lightning Network 1200 may be continuously probed to allow an entity to learn about other intermediaries in payment paths (e.g., Max in the example shown in FIG. 15). The intermediate nodes may be tracked to determine whether there is collusion with suspected nodes (e.g., Nile in the example shown in FIG. 15).

Figure 16:
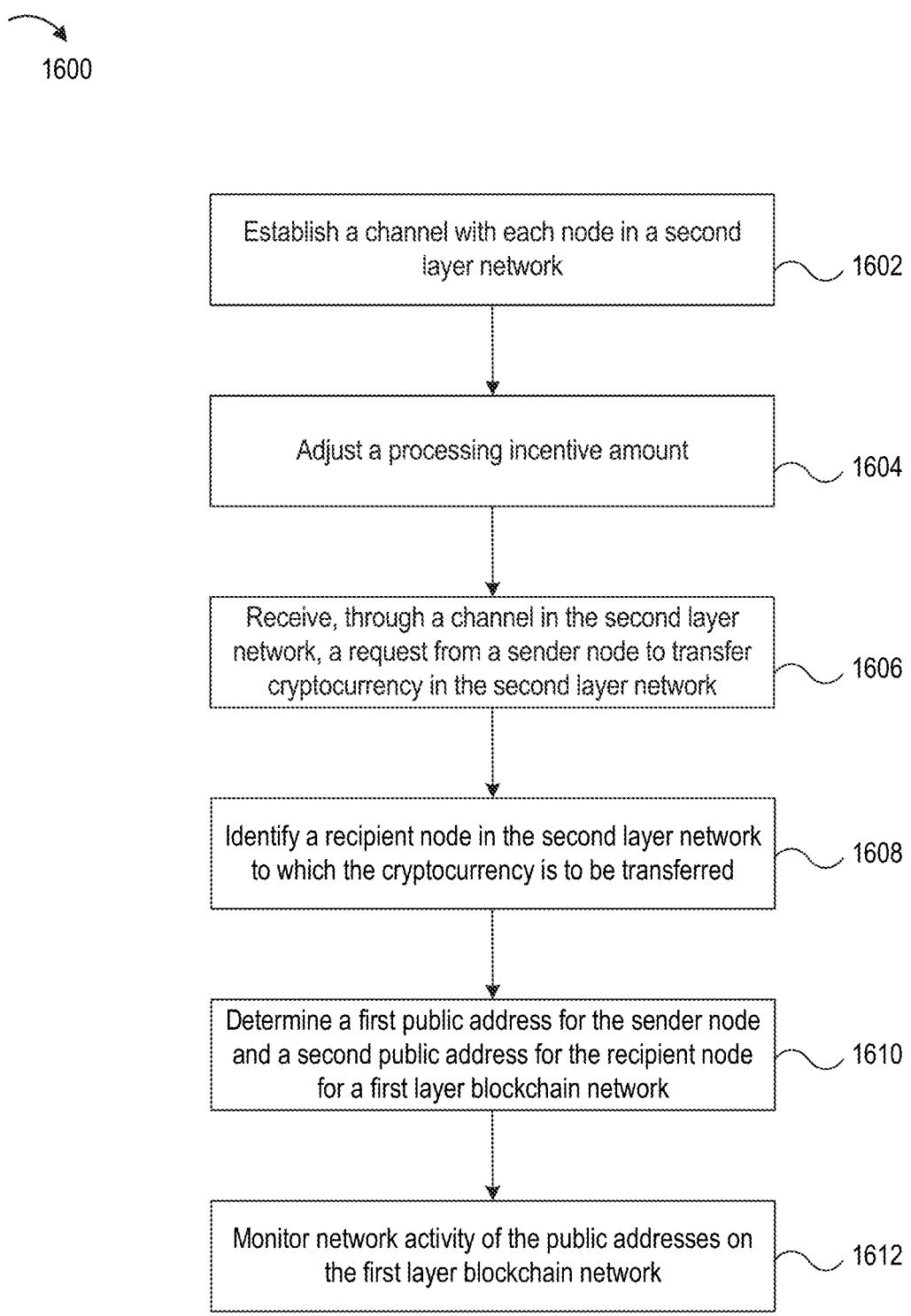
FIGS. 16-17 illustrate a flowchart showing a process for monitoring transactions in a second layer network according to embodiments of the present disclosure.
Figure 17:
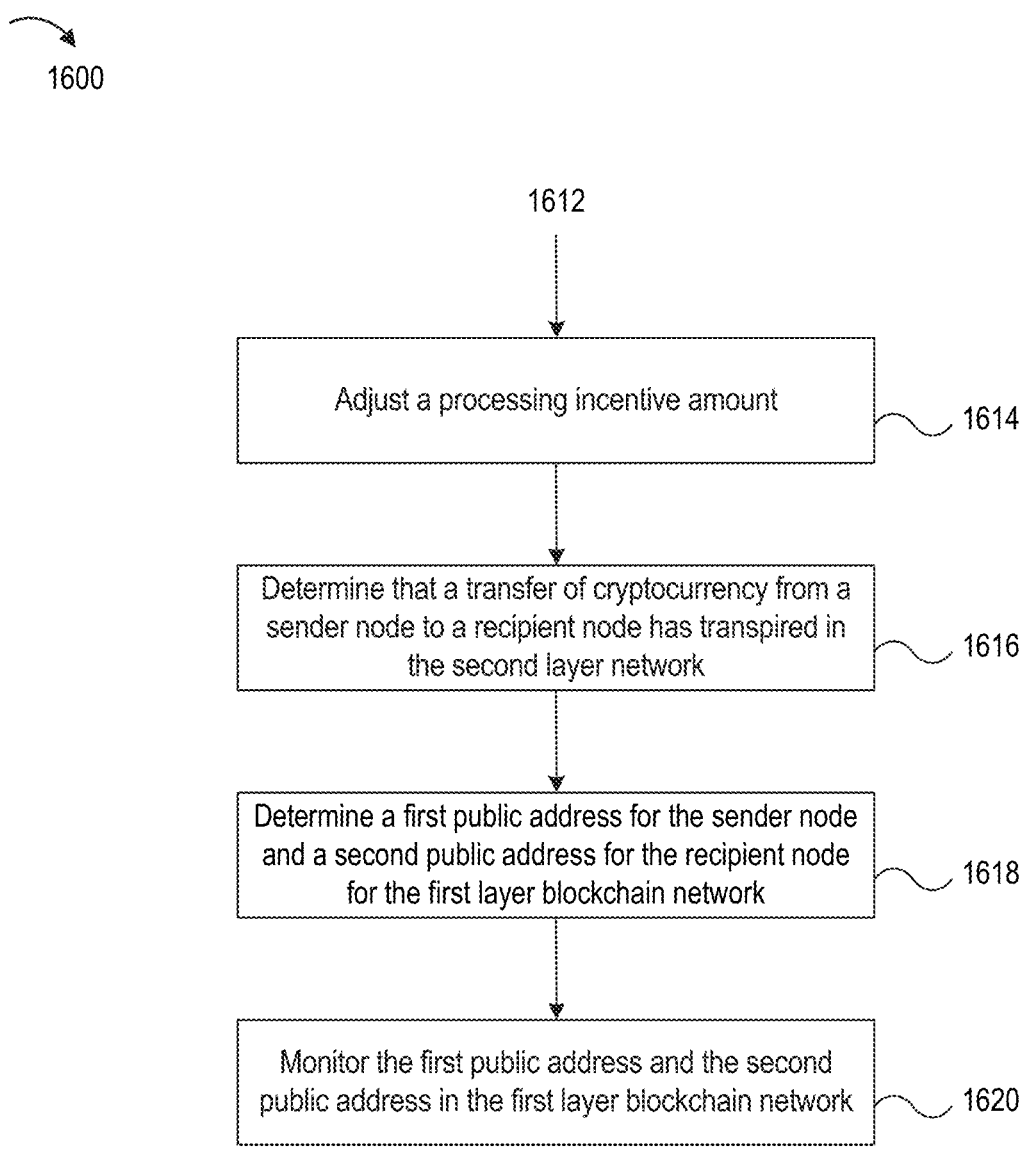

Referring now to FIGS. 16 and 17, illustrated is a flow diagram of a process 1600 for monitoring transactions in a second layer network, which was built on a first layer blockchain, in accordance with embodiments of the present disclosure. The blocks of process 1600 are described herein as occurring in serial, or linearly (e.g., one after another). However, multiple blocks of process 1600 may occur in parallel. In addition, the blocks of process 1600 need not be performed in the order shown and/or one or more of the blocks of process 1600 need not be performed.

It will be appreciated that first, second, third, etc. are generally used as identifiers herein for explanatory purposes and are not necessarily intended to imply an ordering, sequence, or temporal aspect as can generally be appreciated from the context within which first, second, third, etc. are used.

In some embodiments, various operations of the process 1600 may be performed by a computer system having at least a non-transitory memory (e.g., a machine-readable medium) and one or more hardware processors configured to read instructions from the non-transitory memory to cause the system to perform the process 1600. For example, the computer system may include one or more computer devices 1105 of FIG. 11.

At block 1602, the computer system may establish a payment channel with each node in a second layer network (the Lightning Network 200) that is layered on (e.g., a protocol for) a first layer blockchain network (e.g., a main blockchain network, a first layer blockchain network for the blockchain 1202). The computer system may be a node participating in the second layer network and be operated by a controlling entity. The computer system may establish a payment channel with each node participating in the second layer network such that the computer system is one hop away from every node in the second layer network. In other words, when a first node wants to conduct a transaction with a second node in the second layer network but does not have a direct payment channel with the second node, the first node may send cryptocurrency to the second node indirectly using the computer system as an intermediate node to reach the second node. The second layer network may be layered on top of the first layer blockchain network such that participating nodes in the second layer network may conduct second layer cryptocurrency transactions through payment channels in the second layer network, which, as previously discussed, does not require sending the transactions to miner nodes in the first layer blockchain network.

In some embodiments, the computer system may probe the topology of the second layer network to search for nodes with which the computer system has not yet established a payment channel. If the computer system discovers any new nodes in the probing operation, the computer system may establish an additional payment channel in the second layer network with each discovered new node. In some cases, the computer system may probe the topology periodically and/or sufficiently frequently, such that new nodes in the second layer network do not go undiscovered by the computer system.

At block 1604, the computer system may adjust a processing incentive amount (e.g., transaction fee, routing fee) for using the computer system as an intermediate node in a payment path to transfer cryptocurrency between nodes in the second layer network. The processing incentive may be adjusted to be less than each processing incentive amount broadcasted by other nodes offering to act as intermediaries in the second layer network. Thus, the computer system may be a most cost-efficient intermediate node in the second layer network when it has adjusted its incentive amount to a minimal amount. Therefore, sender nodes in the second layer network will be encouraged to use the computer system as a cost-effective intermediate node in a payment path to reach a recipient node.

At block 1606, the computer system may receive, through one of its established payment channels in the second layer network, a request from a sender node to transfer cryptocurrency. In some embodiments, the request may be in the form of a payment to the computer system that locked under a condition defined in an HTLC attached to the payment. For example, the condition may be $y=H(x)$, where y is provided to the computer system and if the computer system can solve for x such that $y=H(x)$, the computer system may receive the payment. The value for x may be a random alphanumeric and/or symbol string and y may be the hash of the value for x. The sender node may not provide the computer system with the value of x, and solving for the value of x may be too computationally expensive to try to solve (e.g., the cost of energy that would be spent in trying to solve for x far exceeds an equivalent unit amount corresponding to the processing incentive amount).

Thus, the payment may act as a request since the computer system may need to broadcast a payment with the HTLC to other nodes in the second layer network, which are connected to the computer system via a payment channel, to determine which node knows the value of x. For example, the computer system may send a payment to each of the nodes via their respective payment channels established with the computer system, where the payment has an HTLC condition of $y=H(x)$, where x must be provided such that $H(x)$ is equal to the given y, in order to receive the payment by a deadline also defined in the HTLC. The payment that is broadcasted to the other nodes in the second layer network may be equivalent to the amount for the payment from the sender node to the computer system (or a difference being the processing incentive amount awarded to the computer system), so that if a recipient node is able to provide the value of x to the computer system by a deadline, the recipient node will receive the payment from the computer system, and then the computer system can use the learned value of x to subsequently receive the payment from the sender node. As such, the computer system may act as an intermediary node between the sender node and the recipient node.

At block 1608, the computer system may identify a recipient node in the second layer network to which the cryptocurrency is to be transferred. For example, the computer system may receive, from a node, a response to the broadcasted HTLC condition indicating that the node has knowledge of the value of x to solve the HTLC condition. Since the node knows the value of x, it is presumed to be the recipient node. In various embodiments, the recipient node may be made aware of the value of x through communications external to the second layer network. For example, a sender user corresponding to the sender node may have provided a recipient user corresponding recipient node a text message, email message or other form of communication that contains the value for x.

Once the recipient has been identified by providing the value for x to the computer system, the computer system may proceed to make the cryptocurrency payment to the recipient node, and subsequently receive a cryptocurrency payment from the sender node using the same value of x (invariably disclosed by the recipient node in order for the recipient node to receive its payment form the computer system) to solve the condition that the sender node placed in the HTLC with the computer system. The computer system may then get to keep the processing incentive amount as a reward for facilitating the transaction.

At block 1610, the computer system may determine a first public address for the sender node and a second public address for the recipient node for the first layer blockchain network. For example, since the computer system has established a payment channel with the sender node as well as a payment channel with the recipient node, the computer system may determine the respective public keys for the sender node and recipient node that were used to establish the respective payment channels (e.g., at block 1602). The public keys may be for the first layer blockchain network. In some cases, the computer system may determine a public address from a public key. For example, the computer system may determine a public address for the sender node or the recipient node by hashing their respective public keys according to a hashing protocol specific to the first layer blockchain network.

As an illustration, for the Bitcoin blockchain, a public address (Bitcoin address) is a 160-bit hash used to identify the node that the Bitcoin can be sent to. The public address can be calculated by running a public key through the SHA-256 and then running the result through the RIPEMD160 (RACE integrity primitives evaluation message digest). A "00" (main network version) may be added to this hash and SHA-256 may be applied twice, resulting in a 256-bit hash. The first 4 bytes of the 256-bit hash may be taken and added to the end of the RIPEMD160 hash, resulting in a 25-byte binary address.

Once the public addresses are known, the computer system may proceed to block 1612, in which the computer system may monitor network activity of the public addresses on the first layer blockchain network. In some embodiments, the computer system may monitor the public addresses to determine whether the corresponding users open other payment channels in the second layer network. If the users open other payment channels, the computer system may continue to track second layer activities associated with the opened payment channels, such as by acting as an intermediary node or querying the payment channel capacities to track the movement of funds between the user that opened the payment channel(s), any counterparties that opened the channel with the user, and any end recipients in payment paths originating from said users, which could be an alias used for money laundering.

Thus, by using the process 1600, the computer system may be able to track the movement of funds in the first layer network and the second layer network and generate a report that includes the public addresses of the sender node, the recipient node, and other nodes that partake in transactions with said nodes in the second layer network. The report may be usable to track network activity of the public addresses of those nodes on the first layer network and also may indicate how the tracked network activity on the first layer network relates to activity on the second layer network, and vice versa. In some cases, the reports may assist law enforcement agencies determine the identity of users when the users attempt to cash out at cryptocurrency exchange platforms.

In some embodiments, the computer system may monitor the public addresses to determine whether user(s) corresponding to said public addresses exchange their cryptocurrency for other cryptocurrencies or cash (e.g., perform a cash-out transaction at a cryptocurrency exchange platform). In such events, an identity for a user associated with a public address may be revealed, which can be useful in instances where the process 1600 is used for detecting money laundering attempts using the second layer network.

In some embodiments, the computer system may transition between a high processing incentive amount and a low processing incentive amount, or vice versa, as needed to modify how the computer system interacts with other nodes in the second layer network. For example, referring to FIG. 17, at block 1614, the computer system may adjust a processing incentive amount from a low processing incentive amount to a high processing incentive amount. The low processing incentive amount may be a sufficiently small amount used to encourage all nodes in the second layer network to use the computer system as an intermediate node in a payment path to reach other nodes within one hop. For example, the low processing incentive amount may be the smallest amount available in the second layer network amongst other nodes offering to process transactions in the second layer network.

When the computer system adjusts its processing incentive amount from the low amount to a high amount, the nodes in the second layer network may avoid using the computer system as an intermediate node in a payment path to make a payment to an end recipient node. For example, if the processing incentive amount is an amount that is higher than all other available processing nodes in the second layer network, it may be considered the node of last resort to use in a payment path and is unlikely to be used at all.

At block 1616, the computer system may determine that a transfer of cryptocurrency from a sender node to a recipient node has transpired in the second layer network. The computer system may determine that the transfer transpired based on periodic querying of each of the payment channel capacities in the second layer network such that a record of the balances can be used along with the knowledge of the counterparties in the payment channels to deduce/determine who has transacted with whom and for what amount. In other words, by analyzing transaction amounts between parties and when they occur in the second layer network, the computer system may deduce payment paths for transactions that transpire in the second layer network. With knowledge of the payment paths, the computer system may determine a flow of funds from a certain user in the second layer network.

In some embodiments, the computer system may focus on a specific node in the second layer network to determine what transfers are being made by the specific node in the second layer network. For example, where the specific node is a user (e.g., a known public address) of interest that is known from his/her activities conducted in the first layer network (e.g., theft), the computer system may use the public address of the user to follow the user into the second layer network and monitor each of the transactions that transpire in association with the user. In this regard, the computer system may be able to determine each of the nodes that may receive cryptocurrency from the user in the second layer network, which could be aliases of the user or accomplices that the user is using to launder money through use of the second layer network.

At block 1618, for the transfer determined to have transpired in the second layer network, the computer system may determine a first public address for the sender node and a second public address for the recipient node for the first layer blockchain network. For example, the computer system may determine the public addresses using similar operations to those discussed at block 1610. At block 1618, the computer system may monitor the first and second public addresses in the first layer blockchain network using similar operations to those discussed at block 1612.

Thus, the computer system may be able to track the movement of funds in the first layer network and the second layer network, without being a participant in the movement of the funds. The computer system may generate a report that includes the public addresses of the sender node, the recipient node, and other nodes that partake in transactions with said nodes in the second layer network. The report may be usable to track network activity of the public addresses of those nodes on the first layer network and also may indicate how the tracked network activity on the first layer network relates to activity on the second layer network, and vice versa. In some cases, the reports may assist law enforcement agencies determine the identity of users when the users attempt to cash out at cryptocurrency exchange platforms.

While reference is made to the "Lightning Network" and the "Bitcoin blockchain," such terms or used for simplicity of explanation, and are not intended to limit the embodiments of the present disclosure as it will be appreciated that the concepts discussed herein may be applied to other second layer protocols and blockchain networks.

Where applicable, various embodiments provided by the present disclosure may be implemented using hardware, software, or combinations of hardware and software. Also, where applicable, the various hardware components and/or software components set forth herein may be combined into composite components comprising software, hardware, and/or both without departing from the spirit of the present disclosure. Where applicable, the various hardware components and/or software components set forth herein may be separated into sub-components comprising software, hardware, or both without departing from the scope of the present disclosure. In addition, where applicable, it is contemplated that software components may be implemented as hardware components and vice-versa.

Software in accordance with the present disclosure, such as program code and/or data, may be stored on one or more computer readable mediums. It is also contemplated that software identified herein may be implemented using one or more general purpose or specific purpose computers and/or computer systems, networked and/or otherwise. Where applicable, the ordering of various steps described herein may be changed, combined into composite steps, and/or separated into sub-steps to provide features described herein.

The various features and steps described herein may be implemented as systems comprising one or more memories storing various information described herein and one or more processors coupled to the one or more memories and a network, wherein the one or more processors are operable to perform steps as described herein, as non-transitory machine-readable medium comprising a plurality of machine-readable instructions which, when executed by one or more processors, are adapted to cause the one or more processors to perform a method comprising steps described herein, and methods performed by one or more devices, such as a hardware processor, user device, server, and other devices described herein.

What is claimed is:

1. A computer system comprising:
a non-transitory memory storing instructions; and
one or more hardware processors configured to execute the instructions and cause the computer system to perform operations comprising:
   receiving, through a first channel in a second layer network layered on top of a first layer blockchain network, a request to transfer cryptocurrency from a first node in the second layer network, wherein the request to transfer the cryptocurrency is locked under a specified condition, wherein the request to transfer the cryptocurrency is unlocked when the specified condition is resolved, and wherein the resolution of the specified condition involves a value of a variable that is unknown to the computer system;
   receiving, from a second node in the second layer network, the value of the variable;
   identifying, based on the receiving of the value of the variable, the second node in the second layer network as a recipient to which to transfer the cryptocurrency;
   determining a first public address for the first node based on information associated with an establishment of the first channel;
   determining a second public address for the second node based on information associated with an establishment of a second channel between the computer system and the second node, wherein the first public address and the second public address are used for the first layer blockchain network;
   monitoring network activity of the first public address or the second public address, wherein the monitoring comprises:
      probing a topology of the second layer network;
      discovering one or more new nodes in the second layer network based on the probing; and
      determining whether the first node or the second node opens an additional channel with at least one of the one or more new nodes in the second layer network; and
   detecting, based on the monitoring of the network activity, a potential money laundering attempt associated with a first user corresponding to the first public address or with a second user corresponding to the second public address.

2. The computer system of claim 1, wherein the operations further comprise:
establishing a channel with each node in the second layer network such that the computer system is a third node in the second layer network that is one hop away from every node in the second layer network.

3. The computer system of claim 2, wherein the operations further comprise adjusting a processing incentive amount for using the third node to transfer the cryptocurrency between nodes in the second layer network.

4. The computer system of claim 3, wherein the processing incentive amount is adjusted to be less than each processing incentive amount broadcasted by other processing nodes in the second layer network.

5. The computer system of claim 1, wherein the operations further comprise:
tracking transfers of the cryptocurrency from the second node to other nodes in the second layer network;
determining public addresses of the other nodes for the first layer blockchain network; and generating a report that includes the public addresses of the first node, the second node, and the other nodes, wherein the report is useable to monitor network activity of the public addresses on the first layer blockchain network.

6. The computer system of claim 1, wherein the operations further comprise routing the cryptocurrency, from the first node to the second node, using the second channel in the second layer network, wherein the first channel was established between the computer system and the first node with an inclusion of a first hashed timelock contract (HTLC), and wherein the second channel was established between the computer system and the second node with an inclusion of a second HTLC that has a same condition as the first HTLC.

7. The computer system of claim 1, wherein the probing of the topology is performed on a periodic basis.

8. The computer system of claim 1, wherein the additional channel comprises a payment channel.

9. A method, comprising:
receiving, through a first channel in a second layer network layered on top of a first layer blockchain network, a request to transfer cryptocurrency from a first node in the second layer network, wherein the request to transfer the cryptocurrency is locked under a specified condition, and wherein the resolution of the specified condition involves a value of a variable that is unknown to an entity that receives the request;
receiving, from a second node in the second layer network, the value of the variable;
identifying, based on the receiving of the value of the variable, the second node in the second layer network as a recipient to which to transfer the cryptocurrency;
determining a first public address for the first node based on information associated with an establishment of the first channel;
determining a second public address for the second node based on information associated with an establishment of a second channel between a computer system and the second node, wherein the first public address and the second public address are usable for the first layer blockchain network;
monitoring network activity of the first public address or the second public address, wherein the monitoring comprises:
accessing a plurality of nodes of the second layer network based on a probed topology of the second layer network; and
determining whether the first node or the second node opens an additional channel with a node of the plurality of nodes of the second layer network; and
detecting, based on the monitoring of the network activity, a potential money laundering attempt associated with a first user corresponding to the first public address or with a second user corresponding to the second public address.

10. The method of claim 9, further comprising:
establishing a channel with each node in the second layer network such that the computer system is a third node in the second layer network that is one hop away from other nodes in the second layer network.

11. The method of claim 10, further comprising adjusting a processing incentive amount for using the third node to transfer the cryptocurrency between nodes in the second layer network.

12. The method of claim 11, wherein the processing incentive amount is adjusted to be less than each processing incentive amount broadcasted by other processing nodes in the second layer network.

13. The method of claim 9, further comprising:
tracking transfers of the cryptocurrency from the second node to other nodes in the second layer network;
determining public addresses of the other nodes for the first layer blockchain network; and
generating a report that includes the public addresses of the first node, the second node, and the other nodes, wherein the report is useable to monitor network activity of the public addresses on the first layer blockchain network.

14. The method of claim 9, further comprising routing the cryptocurrency, from the first node to the second node, using the second channel in the second layer network, wherein the first channel was established between the computer system and the first node with an inclusion of a first hashed timelock contract (HTLC), and wherein the second channel was established between the computer system and the second node with an inclusion of a second HTLC that has a same condition as the first HTLC.

15. The method of claim 9, further comprising discovering one or more new nodes of the plurality of nodes based on probing the topology of the second layer network.

16. A non-transitory machine-readable medium having instructions stored thereon, wherein the instructions are executable to cause a machine of a system to perform operations comprising:
receiving, through a first channel in a second layer network layered on top of a first layer blockchain network, a request to transfer cryptocurrency from a first node in the second layer network, wherein the request to transfer the cryptocurrency is locked under a specified condition, and wherein the resolution of the specified condition involves a value of a variable that is unknown to an entity that receives the request;
receiving, from a second node in the second layer network, the value of the variable;
identifying, based on the receiving of the value of the variable, the second node in the second layer network as a recipient to which to transfer the cryptocurrency;
determining a first public address for the first node based on information associated with an establishment of the first channel;
determining a second public address for the second node based on information associated with an establishment of a second channel between a computer system and the second node, wherein the first public address and the second public address are used for the first layer blockchain network;
monitoring network activity of the first public address or the second public address at least in part by:
accessing a topology of the second layer network, the topology associated with a plurality of nodes; and
determining that the first node or the second node has opened a payment channel with one or more nodes of the plurality of nodes; and
detecting, based on the monitoring of the network activity, a potential money laundering attempt associated with a first user corresponding to the first public address or with a second user corresponding to the second public address.

17. The non-transitory machine-readable medium of claim 16, wherein the operations further comprise:
    establishing a channel with each node in the second layer network such that the system is a third node in the second layer network that is one hop away from one or more other nodes in the second layer network.

18. The non-transitory machine-readable medium of claim 17, wherein the operations further comprise adjusting a processing incentive amount for using the third node to transfer the cryptocurrency between nodes in the second layer network.

19. The non-transitory machine-readable medium of claim 18, wherein the processing incentive amount is adjusted to be less than each processing incentive amount broadcasted by other processing nodes in the second layer network.

20. The non-transitory machine-readable medium of claim 16, wherein the operations further comprise:
    tracking transfers of the cryptocurrency from the second node to other nodes in the second layer network;
    determining public addresses of the other nodes for the first layer blockchain network; and
    generating a report that includes the public addresses of the first node, the second node, and the other nodes, wherein the report is useable to monitor network activity of the public addresses on the first layer blockchain network.

\* \* \* \* \*